US012739380B2

(12) United States Patent
Zhu et al.

(10) Patent No.: US 12,739,380 B2
(45) Date of Patent: Sep. 15, 2026

(54) TECHNIQUES FOR SELECTING BETWEEN SCALAR QUANTIZATION AND TRELLIS CODED QUANTIZATION WHEN ENCODING VIDEO DATA

(71) Applicant: NETFLIX, INC., Los Gatos, CA (US)

(72) Inventors: Xiaoqing Zhu, Austin, TX (US); Rubén Aciego Casero, San Jose, CA (US); Andrey Norkin, Campbell, CA (US); Joel Sole Rojals, San Diego, CA (US)

( * ) Notice: Subject to any disclaimer, the term of this patent is extended or adjusted under 35 U.S.C. 154(b) by 0 days.

(21) Appl. No.: 19/058,963

(22) Filed: Feb. 20, 2025

(65) Prior Publication Data

US 2025/0358420 A1 Nov. 20, 2025

Related U.S. Application Data

(60) Provisional application No. 63/647,364, filed on May 14, 2024.

(51) Int. Cl.
*H04N 19/124* (2014.01)
*H04N 19/13* (2014.01)
(Continued)

(52) U.S. Cl.
CPC ........... *H04N 19/124* (2014.11); *H04N 19/13* (2014.11); *H04N 19/147* (2014.11);
(Continued)

(58) Field of Classification Search
CPC .... H04N 19/124; H04N 19/13; H04N 19/147; H04N 19/176; H04N 19/18; H04N 19/46;
(Continued)

(56) References Cited

U.S. PATENT DOCUMENTS 12,101,107 B2 9/2024 Wang et al.
2019/0387259 A1* 12/2019 Coban ................. H04N 19/184
(Continued)

FOREIGN PATENT DOCUMENTS

EP 4 354 861 A1 4/2024
WO 2020/007785 A1 1/2020
(Continued)

OTHER PUBLICATIONS

Non Final Office Action received for U.S. Appl. No. 19/058,925, dated Jan. 27, 2026, 21 pages.
(Continued)

*Primary Examiner* — Nasim N Nirjhar
(74) *Attorney, Agent, or Firm* — Artegis Law Group, LLP

(57) ABSTRACT

In various embodiments, an encoder receives transform coefficients of prediction residues associated with video data. The encoder sets a flag value based on at least one of metadata or transform statistics associated with a vector of the transform coefficients. The encoder performs trellis coded quantization operations on the vector of the transform coefficients to generate a vector of quantization indices or one or more scalar quantization operations on the transform coefficients to generate a set of quantization indices based on the flag value. The encoder performs entropy coding operations on either the vector of quantization indices or a vector corresponding to the set of quantization indices to generate encoded video data.

20 Claims, 12 Drawing Sheets

(51) Int. Cl.

| | |
|---|---|
| ***H04N 19/147*** | (2014.01) |
| ***H04N 19/176*** | (2014.01) |
| ***H04N 19/18*** | (2014.01) |
| ***H04N 19/46*** | (2014.01) |
| ***H04N 19/61*** | (2014.01) |
| ***H04N 19/91*** | (2014.01) |

(52) U.S. Cl.
CPC .......... *H04N 19/176* (2014.11); *H04N 19/18* (2014.11); *H04N 19/46* (2014.11); *H04N 19/61* (2014.11); *H04N 19/91* (2014.11)

(58) Field of Classification Search
CPC ...... H04N 19/61; H04N 19/91; H04N 19/126; H04N 19/463; H04N 19/70
See application file for complete search history.

(56) References Cited

U.S. PATENT DOCUMENTS

| | | | | |
|---|---|---|---|---|
| 2021/0084304 | A1* | 3/2021 | Schwarz | H04N 19/91 |
| 2021/0136385 | A1 | 5/2021 | Schwarz et al. | |
| 2021/0400276 | A1* | 12/2021 | Chen | H04N 19/176 |
| 2024/0114140 | A1* | 4/2024 | Dai | H04N 19/46 |
| 2024/0414339 | A1* | 12/2024 | Karczewicz | H04N 19/186 |
| 2025/0045973 | A1 | 2/2025 | Haase et al. | |
| 2025/0055997 | A1 | 2/2025 | Chen et al. | |
| 2025/0133210 | A1* | 4/2025 | Xu | H04N 19/126 |
| 2025/0254313 | A1 | 8/2025 | Schwarz et al. | |
| 2025/0392717 | A1* | 12/2025 | Chuang | H04N 19/124 |

FOREIGN PATENT DOCUMENTS

| | | | | |
|---|---|---|---|---|
| WO | 2020/056017 | A1 | 3/2020 | |
| WO | 2020/106668 | A1 | 5/2020 | |
| WO | 2022/217447 | A1 | 10/2022 | |
| WO | WO-2023132660 | A1 * | 7/2023 | H04N 19/129 |
| WO | WO-2024209021 | A1 * | 10/2024 | H04N 19/146 |
| WO | 2025/214702 | A1 | 10/2025 | |

OTHER PUBLICATIONS

Non Final Office Action received for U.S. Appl. No. 19/058,931, dated Jan. 27, 2026, 19 pages.

Non Final Office Action received for U.S. Appl. No. 19/058,938, dated Mar. 11, 2026, 29 pages.

International Search Report for Application No. PCT/US2025/028950 dated Sep. 11, 2025.

International Search Report for Application No. PCT/US2025/028964 dated Sep. 16, 2025.

International Search Report for Application No. PCT/US2025/028945 dated Sep. 18, 2025.

Wang et al., "Low Complexity Trellis-Coded Quantization in Versatile Video Coding", IEEE Transactions on Image Processing, DOI: 10.1109/TIP.2021.3051460, vol. 30, 2021, pp. 2378-2393.

Bross et al., "Versatile Video Coding (Draft 4)", Joint Video Experts Team of ITU-T SG 16 WP 3 and ISO/IEC JTC 1/SC 29/WG 11, Jan. 2019, 299 pages.

Schwarz et al., "Quantization and Entropy Coding in the Versatile Video Coding (VVC) Standard", IEEE Transactions on Circuits and Systems for Video Technology, DOI 10.1109/TCSVT.2021.3072202, vol. 31, No. 10, Oct. 2021, pp. 3891-3906.

Non Final Office Action received for U.S. Appl. No. 19/058,985, dated Mar. 26, 2026, 24 pages.

Non Final Office Action received for U.S. Appl. No. 19/058,945, dated Apr. 1, 2026, 27 pages.

Final Office Action received for U.S. Appl. No. 19/058,931, dated Jun. 26, 2026, 24 pages.

* cited by examiner

| Current State = $s(k)$ | Current Quantizer | Next State = $s(k+1)$ if $q(k)$ is even | if $q(k)$ is odd |
|---|---|---|---|
| 0 | $Q_0$ | 0 | 2 |
| 1 | $Q_0$ | 2 | 0 |
| 2 | $Q_1$ | 1 | 3 |
| 3 | $Q_1$ | 3 | 1 |

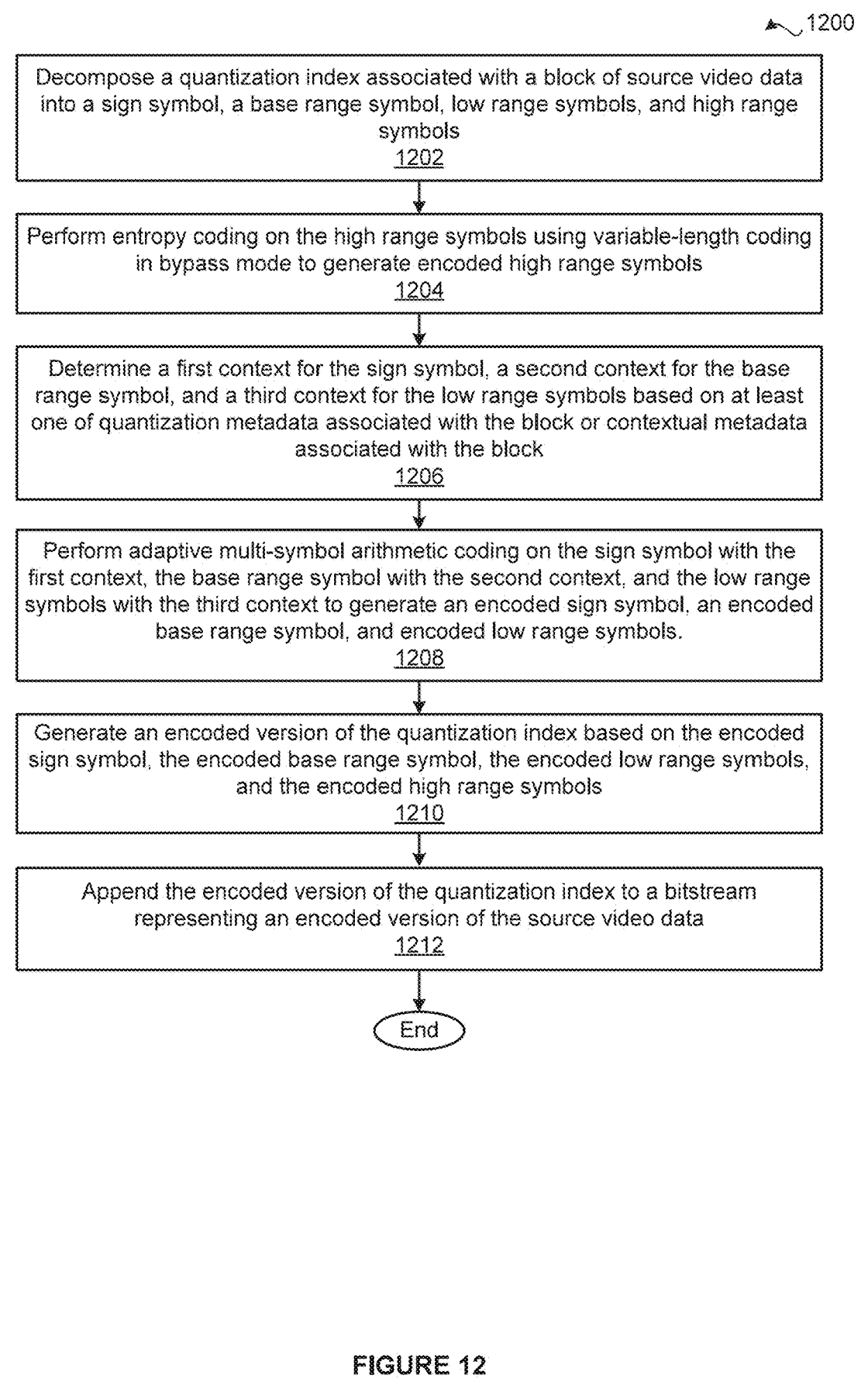

Decompose a quantization index associated with a block of source video data into a sign symbol, a base range symbol, low range symbols, and high range symbols
1202

Perform entropy coding on the high range symbols using variable-length coding in bypass mode to generate encoded high range symbols
1204

Determine a first context for the sign symbol, a second context for the base range symbol, and a third context for the low range symbols based on at least one of quantization metadata associated with the block or contextual metadata associated with the block
1206

Perform adaptive multi-symbol arithmetic coding on the sign symbol with the first context, the base range symbol with the second context, and the low range symbols with the third context to generate an encoded sign symbol, an encoded base range symbol, and encoded low range symbols.
1208

Generate an encoded version of the quantization index based on the encoded sign symbol, the encoded base range symbol, the encoded low range symbols, and the encoded high range symbols
1210

Append the encoded version of the quantization index to a bitstream representing an encoded version of the source video data
1212

End

FIGURE 12

TECHNIQUES FOR SELECTING BETWEEN SCALAR QUANTIZATION AND TRELLIS CODED QUANTIZATION WHEN ENCODING VIDEO DATA

CROSS-REFERENCE TO RELATED APPLICATIONS

This application claims priority benefit of the United States Provisional Patent Application titled, "TRELLIS CODED QUANTIZATION FOR AVM," filed on May 14, 2024, and having Ser. No. 63/647,364. The subject matter of this related application is hereby incorporated herein by reference.

BACKGROUND

Field of the Various Embodiments

The various embodiments relate generally to computer science and media encoding technologies and, more specifically, to techniques for selecting between scalar quantization and trellis coded quantization when encoding video data.

Description of the Related Art

Efficiently and accurately encoding video data is an important aspect of streaming high-quality videos in real-time or in near-real-time. Typically, as an encoded version of a video is streamed to an endpoint device for playback, the encoded video data is decoded to generate reconstructed video data that is subsequently played back on the endpoint device. To increase the degree of data compression and, accordingly, reduce the size of the encoded videos, encoders typically implement various data compression techniques. The data compression techniques are generally designed to eliminate certain selected information during the encoding process while ensuring that the visual quality of the reconstructed video derived from an encoded video remains at an acceptable level. In this regard, many encoders implement a data compression technique known as quantization, which reduces the precision with which certain data values are represented by mapping those data values to a smaller set of possible data values that can be represented using fewer bits. In the context of video encoding, quantization is applied to transform coefficients that are associated with a block of video data to generate quantized transform coefficients.

In one approach to performing quantization, scalar quantization operations are individually applied to each transform coefficient associated with a block of video data. In some implementations, a given transform coefficient is divided by a quantization step size to generate an integer quantization index that can be represented using fewer bits than the number of bits used to represent that original transform coefficient. During decoding, a given transform coefficient is reconstructed by multiplying the corresponding quantization index by the quantization step size. The value of each reconstructed transform coefficient is equal to the closest multiple of the quantization step size. In addition, a distortion or "error" associated with the reconstructed transform coefficient is equal to the difference between the transform coefficient and the value of the reconstructed transform coefficient.

One drawback of scalar quantization is that, because scalar quantization operations are performed independently on each transform coefficient, the effectiveness of subsequent entropy coding operations can be substantially reduced, which can decrease the overall efficiency of the encoding process. More specifically, in many implementations, entropy coding is used to compress a sequence of transform coefficients corresponding to a block of video data in order to generate a sequence of encoded bits. To achieve the compression, shorter binary codes are assigned to more frequently appearing transform coefficients, and longer binary codes are assigned to less frequently appearing transform coefficients. However, because scalar quantization does not account for correlations between transform coefficients when generating corresponding quantization indices, scalar quantization can fail to exploit opportunities for increased compression during entropy coding. For example, as the number of repeated quantization indices in a sequence of quantization indices increases, the compression achieved during entropy coding usually increases as well. But, if two different transform coefficients (e.g., 1.49*the quantization step size and 1.51*the quantization step size) associated with a block of video data happen to be mapped to different quantization indices during scalar quantization, then the values of the resulting quantized indices are going to be different and, therefore, not as effectively compressed during entropy coding. Accordingly, in such situations, opportunities for increased compression during entropy coding can be lost, and overall encoding efficiency can be substantially reduced.

As the foregoing illustrates, what is needed in the art are more effective techniques for performing quantization when encoding video data.

SUMMARY

One embodiment sets forth a computer-implemented method for encoding video data. The method includes receiving transform coefficients of prediction residues; setting a flag value based on at least one of metadata associated with a first vector that includes the transform coefficients or a set of transform statistics associated with the transform coefficients; performing one or more trellis coded quantization operations on the first vector to generate a second vector that includes quantization indices or one or more scalar quantization operations on the transform coefficients to generate a set of quantization indices based on the flag value; and performing one or more entropy coding operations on either the second vector that includes the quantization indices or a third vector that includes the set of quantization indices to generate encoded video data.

At least one technical advantage of the disclosed techniques relative to the prior art is that, with the disclosed techniques, trellis coded quantization operations are applied to a sequence of transform coefficients corresponding to a block of video data to generate a sequence of quantization indices that can be more effectively compressed during entropy coding. In this regard, with the disclosed techniques, different possible permutations of the sequence of quantization indices are generated and evaluated with respect to a cost function that represents a tradeoff between an estimated distortion and an estimated entropy coding efficiency associated with the entire sequence of quantization indices, and the permutation associated with the lowest cost function value is then used when encoding the block of video data. Because the disclosed techniques account for entropy coding efficiency when generating the different sequences of quantization indices, the disclosed techniques can exploit opportunities for increased compression during entropy coding. As a result, overall encoding efficiency can be increased relative to what can be achieved using conventional scalar quantization operations. These technical advantages provide one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

FIG. 10 is a flow diagram of method steps for performing trellis coded quantization when encoding video data, according to various embodiments;

FIG. 12 is a flow diagram of method steps for performing entropy coding on a quantization index when encoding video data, according to various embodiments.

DETAILED DESCRIPTION

Figure 1:
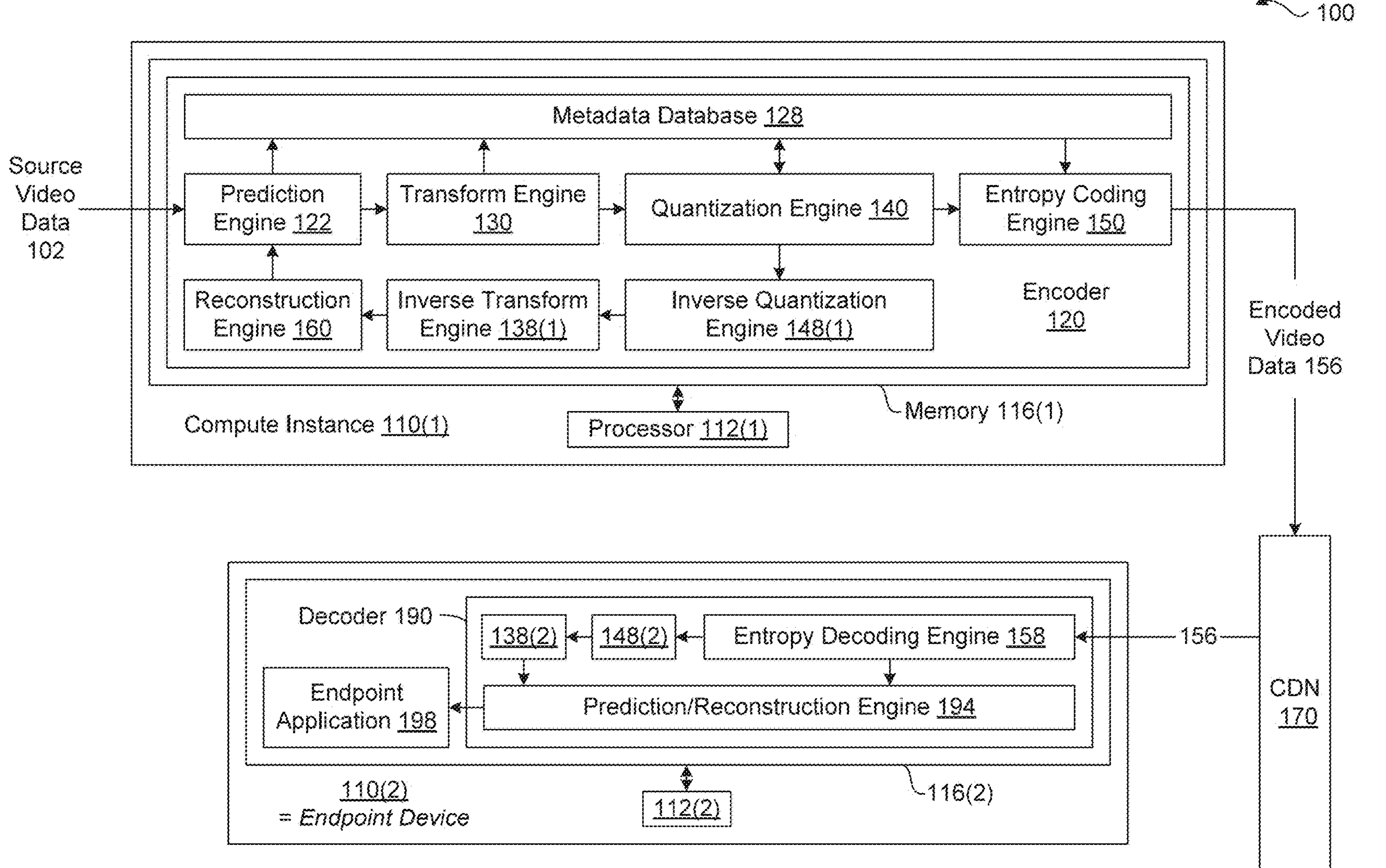
FIG. 1 is a conceptual illustration of a system configured to implement one or more aspects of the various embodiments.

In the following description, numerous specific details are set forth to provide a more thorough understanding of the various embodiments. However, it will be apparent to one skilled in the art that the inventive concepts may be practiced without one or more of these specific details. For explanatory purposes, multiple instances or versions of like objects are denoted with reference numbers identifying the object and parenthetical alphanumeric character(s) identifying the instance where needed.

A typical video streaming service provides access to a library of videos that can be viewed on a range of different endpoint devices. To efficiently deliver videos to endpoint devices, the video streaming service provider uses an encoder to encode the videos and then streams the resulting encoded videos to the endpoint devices. Each endpoint device decodes the stream of encoded video data and displays the resulting reconstructed video to viewers. To increase the degree of compression and, accordingly, reduce the size of encoded videos, a typical encoder implements various data compression techniques.

In particular, many encoders implement a data compression technique known as quantization, which reduces the precision with which certain data values are represented by mapping those data values to a smaller set of possible data values that can be represented using fewer bits. An example of quantization is mapping data values to the closest even integer. In the context of video encoding, quantization is applied to transform coefficients that are associated with a block of video data to generate quantized transform coefficients.

Many conventional encoders implement scalar quantization. In scalar quantization, each transform coefficient is individually mapped to a quantization index. One drawback of scalar quantization is that, because scalar quantization operations are performed independently on each transform coefficient, the effectiveness of subsequent entropy coding operations can be substantially reduced, which can decrease the overall efficiency of the encoding process. More specifically, in many implementations, entropy coding operates on a vector of quantization indices associated with a block of video data, assigning shorter codes to more frequent quantization indices and longer codes to less frequent quantization indices in order to reduce the number encoded bits use to represent the vector of transform coefficients. Because scalar quantization does not account for correlations between transform coefficients when generating corresponding quantization indices, scalar quantization can fail to exploit opportunities for increased compression during entropy coding and therefore overall encoding efficiency can be substantially reduced. For example, if two different transform coefficients (e.g., 34 and 36) associated with a block of video data happen to be mapped to different quantization during scalar quantization, then the resulting quantized indices are going to be different and, therefore, not as effectively compressed during entropy coding.

With the disclosed techniques, however, a quantization engine included in an encoder can selectively apply trellis coded quantization instead of scalar quantization to any number of vectors of transform coefficients corresponding to any number of blocks of video data. When applying trellis coded quantization on a vector of transform coefficients, the quantization engine generates and evaluates with respect to a cost function various possible permutations of a corresponding vector of quantization indices. The cost function represents a tradeoff between an estimated distortion and an estimated entropy coding efficiency associated with the entire sequence of quantization indices. Entropy coding is then performed on the permutation associated with the lowest cost function value.

To further increase overall encoding efficiency with the disclosed techniques, the encoder can implement any of the following improvements related to trellis coded quantization:

1. performing both scalar quantization and trellis coded quantization on each block of transform coefficients and selecting between the resulting quantization indices based on the cost function 2. selecting between scalar quantization and trellis coded quantization when encoding each block of video data based on any amount of contextual data associated with the block
3. evaluating additional possible quantization indices for each transform coefficient during trellis coded quantization
4. adaptively modifying the cost function used during trellis coded quantization based on any amount of contextual data.
5. adaptively modifying one or more step sizes that correlate to the precision with which quantization indices can represent transform coefficients when performing trellis coded quantization
6. adaptively modifying entropy coding to take into account any amount of metadata generated while performing trellis coded quantization Advantageously, because trellis coded quantization accounts for entropy coding efficiency when generating the different sequences of quantization indices, the quantization engine can exploit opportunities for increased compression during entropy coding. As a result, overall encoding efficiency can be increased relative to what can be achieved using conventional scalar quantization operations. These technical advantages provide one or more technological advancements over prior art approaches. At least one additional technical advantage of each of the six improvements related to trellis coded quantization noted above are, respectively:

1. selecting between the results of scalar quantization and trellis coded quantization based on the cost function and explicitly signaling this decision at the encoder can increase overall encoding efficiency associated with some blocks or frames of video data while allowing decoders to use less computationally complex inverse scalar quantization when decoding other blocks or other frames of video data
2. determining whether to perform scalar quantization and trellis coded quantization based on contextual data available at both the encoder and a decoder can increase overall encoding efficiency associated with certain blocks of video data while allowing encoders and decoders to implement less computational complex scalar quantization when encoding and inverse scalar quantization when decoding, respectively, other blocks of video data
3. evaluating additional possible quantization indices for each transform coefficient during trellis coded quantization can result in a vector of quantized transform coefficients that that has a lower communicative cost function value and can therefore increase overall encoding efficiency for the corresponding block of video data
4. adaptively modifying the cost function can enable fine-tuning of a tradeoff between encoding efficiency and distortion per block and better alignment in the reconstruction errors across multiple coded blocks
5. adaptively modifying step size(s) provides opportunities to fine-tune the precision with which transform coefficients can be represented per block, hence better alignment of reconstruction errors across multiple coded blocks
6. adaptively modifying entropy coding can lead to more accurate conditional probability estimates when assigning binary codes of different lengths to different transform coefficients and can therefore increase overall encoding efficiency FIG. 1 is a conceptual illustration of a system configured to implement one or more aspects of the various embodiments. As shown, in some embodiments, the system 100 includes, without limitation, a compute instance 110(1), a compute instance 110(2), and a content delivery network (CDN) 170.

In some other embodiments, the compute instance 110(2) and/or the CDN 170 can be omitted from the system 100. In the same or other embodiments, the system 100 can further include, without limitation, any number and/or types of other compute instances and/or any number and/or types of other CDNs.

Any number of the components of the system 100 can be distributed across multiple geographic locations or implemented in one or more cloud computing environments (e.g., encapsulated shared resources, software, data) in any combination. In some embodiments, the compute instance 110 (1), the compute instance 110(2), one or more other compute instances, or any combination thereof can be implemented in a cloud computing environment, implemented as part of any other distributed computing environment, or implemented in a stand-alone fashion.

As shown, the compute instance 110 includes, without limitation, a processor 112 and a memory 116. In some other embodiments, each of any number of other compute instances can include any number of other processors and any number of other memories in any combination. In particular, the compute instance 110 and/or one or more other compute instances can provide a multiprocessing environment in any technically feasible fashion.

As shown, the compute instance 110(1) includes, without limitation, a processor 112(1) and a memory 116(1), and the compute instance 110(2) includes, without limitation, a processor 112(2) and a memory 116(2). For explanatory purposes, the compute instance 110(1) and the compute instance 110(2) are also referred to herein individually as "the compute instance 110" and collectively as "the compute instances 110." The processor 112(1) and the processor 112(2) are also referred to herein individually as "the processor 112" and collectively as "the processors 112." The memory 116(1) and the memory 116(2) are also referred to herein individually as "the memory 116" and collectively as "the memories 116." Each of the compute instances 110 can be implemented in a cloud computing environment, implemented as part of any other distributed computing environment, or implemented in a stand-alone fashion.

The processor 112 can be any instruction execution system, apparatus, or device capable of executing instructions. For example, the processor 112 could be a central processing unit, a graphics processing unit, a controller, a microcontroller, a state machine, or any combination thereof. The memory 116 of the compute instance 110 stores content, such as software applications and data, for use by the processor 112 of the compute instance 110. The memory 116 can be one or more of a readily available memory, such as random-access memory, read-only memory, floppy disk, hard disk, or any other form of digital storage, local or remote.

In some other embodiments, each compute instance 110 can include any number of processors 112 and any number of memories 116 in any combination. In particular, any number of the compute instances 110 (including one) and/or any number of other compute instances can provide a multiprocessing environment in any technically feasible fashion.

In some embodiments, a storage (not shown) may supplement or replace the memory 116 of the compute instance 110. The storage may include any number and type of external memories that are accessible to the processor 112 of the compute instance 110. For example, and without limitation, the storage can include a Secure Digital Card, an external Flash memory, a portable compact disc read-only memory, an optical storage device, a magnetic storage device, or any suitable combination of the foregoing.

In general, each of the compute instance 110 and any number of other compute instances is configured to implement one or more software applications. For explanatory purposes only, each software application is described as residing in the memory 116 of a single compute instance and executing on the processor 112 of the same compute instance. However, in some embodiments, the functionality of each software application can be distributed across any number of other software applications that reside in the memories of any number of compute instances and execute on the processors of any number of compute instances in any combination. Further, subsets of the functionality of multiple software applications can be consolidated into a single software application.

In particular, the compute instance 110(1) is configured to encode source video data 102 to generate encoded video data 156 and transmit the encoded video data 156 to the CDN 170 for on-demand delivery to any number of endpoint devices. The CDN 170 delivers on-demand portions or "segments" of the encoded video data 156 and any amount of other encoded video data to any number and/or types of endpoint devices. Each endpoint device can be any type of device that includes one or more compute instances and is capable of requesting, decoding, and playing back segments of encoded video data. Some examples of endpoint devices include, without limitation, desktop computers, laptops, smartphones, smart televisions, game consoles, tablets, and set-top boxes. As shown in italics, the compute instance 110(2) is an endpoint device, and the CDN 170 is configure to deliver on-demand the encoded video data 156 and/or any amount and/or types of other encoded video data to the compute instance 110(2).

As described previously herein, conventional encoders implement various data compression techniques to encode source video data. In particular, many conventional encoders apply scalar quantization (SQ) to transform coefficients that are associated with a block of source video data to generate quantized transform coefficients. One drawback of SQ is that, because scalar quantization operations are performed independently on each transform coefficient, the effectiveness of subsequent entropy coding operations can be substantially reduced, which can decrease the overall efficiency of the encoding process.

To address the above problem, the compute instance 110(1) includes an encoder 120 that implements trellis coded quantization (TCQ) instead of or in addition to SQ to increase the overall efficiency of the encoding process. In some embodiments, the encoder 120 also implements one or more improvements associated with TCQ to further increase the overall efficiency of the encoding process. In a complementary fashion, the compute instance 110(2) includes a decoder 190 that implements inverse TCQ instead of or in addition to inverse SQ to generate reconstructed video data based on encoded video data generated by the encoder 120.

As shown, the encoder 120 resides in the memory 116(1) of the compute instance 110(1) and executes on the processor 112(1) of the compute instance 110(1). The encoder 120 includes, without limitation, a prediction engine 122, a transform engine 130, a quantization engine 140, an entropy coding engine 150, an inverse quantization engine 148(1), an inverse transform engine 138(1), a reconstruction engine 160, and a metadata database 128.

The prediction engine 122 implements, without limitation, any number and/or types of partitioning and data compression techniques based on the source video data 102 to generate blocks of prediction residues (not shown). Each block of prediction residues is associated with a different block of the source video data and any amount and/or types of associated contextual metadata (not shown). As shown, in some embodiments, the prediction engine 122 stores contextual metadata in the metadata database 128. The prediction engine 122 can determine any amount of contextual metadata associated any number of blocks of prediction residues in any technically feasible fashion. For instance, in some embodiments, the prediction engine 122 stores a prediction mode (intra prediction mode or inter prediction mode) used to compute a block of prediction residues as contextual metadata associated with that block of prediction residues.

The transform engine 130 applies any number and/or types of transforms (e.g., DCT) to each block of prediction residues to generate a corresponding transform block and any amount and/or types of associated contextual metadata. A transform block includes transform coefficients of prediction residues associated with a block of source video data 102. As shown, in some embodiments, the transform engine 130 stores contextual metadata in the metadata database 128. Contextual metadata is described in greater detail below in conjunction with FIGS. 2, 4, 6, 8, and 11.

The transform engine 130 can determine any amount and/or types of contextual metadata associated with any number of transform blocks in any technically feasible fashion. For instance, in some embodiments, the transform engine 130 stores a transform block size and a transform block type (e.g., Discrete Cosine Transform, Asymmetric Discrete Sine Transform) used to compute a transform block as "configuration" contextual metadata associated with that transform block. In the same or other embodiments, the transform engine 130 performs any number and/or types of statistical analysis operations on the transform coefficients included in a transform block to generate any amount and/or types of "statistical" contextual metadata associated with that transform block. An example of statistical contextual metadata is a number or percentage of zero-value transform coefficients.

The quantization engine 140 performs SQ and/or TCQ operations on each transform block optionally based on any amount and/or types of contextual metadata to generate a quantization index vector and optionally any amount and/or types of quantization metadata. The quantization index vector includes a sequence of quantization indices corresponding to transform coefficients included in the transform block. As shown, in some embodiments, the quantization engine 140 retrieves any amount and/or types of contextual metadata from the metadata database 128. In the same or other embodiments, the quantization engine 140 stores any amount and/or types of quantization metadata in the metadata database 128. The quantization engine 140 and quantization metadata are described in greater detail below in conjunction with FIGS. 2, 4, 6, 8, 9A, and 9B.

The entropy coding engine 150 performs any number and/or types of entropy coding operations on each quantization index vector and any number and/or types of associated syntax elements to incrementally generate the encoded video data 156. In some embodiments, the entropy coding engine 150 can perform entropy coding operations on each quantization index vector based on any amount and/or types of contextual metadata and/or quantization metadata. In the same or other embodiments, the entropy coding engine 150 retrieves any amount and/or types of contextual metadata and/or quantization metadata from the metadata database 128. The entropy coding engine 150 is described in greater detail below in conjunction with FIG. 11.

As persons skilled in the art will recognize, the prediction engine 122 can generate any number of blocks of prediction residues based, at least in part, reconstructed versions of previously encoded blocks of the source video data 102. As shown, the inverse quantization engine 148(1), the inverse transform engine 138(1), and the reconstruction engine 160 collaborate to generate reconstructed versions of previously encoded blocks of the source video data 102 based on previously generated quantization index vectors. More specifically, the inverse quantization engine 148(1) performs any number and/or types of inverse SQ operations and/or inverse TCQ operations on each quantization index vector to generate a corresponding reconstructed transform block. The inverse transform engine 138(1) applies any number and/or types of inverse transforms to each reconstructed transform block to generate a corresponding reconstructed block of prediction residues. The reconstruction engine 160 implements any number and/or types of data decompression techniques on the reconstructed blocks of prediction residues to generate blocks of reconstructed video data.

As shown, the decoder 190 and an endpoint application 198 reside in the memory 116(2) of the compute instance 110(2) and execute on the processor 112(2) of the compute instance 110(2). As the decoder 190 receives segments of the encoded video data 156, the decoder 190 generates segments of reconstructed video data (not shown) that the endpoint application 198 plays back.

As shown, the decoder 190 includes, without limitation, an entropy decoding engine 158, an inverse quantization engine 148(2), an inverse transform engine 138(2), and a prediction/reconstruction engine 194. The inverse quantization engine 148(1) and the inverse quantization engine 148(2) are different instances of an inverse quantization engine. The inverse transform engine 138(1) and the inverse transform engine 138(2) are different instances of an inverse transform engine.

The entropy decoding engine 158 performs any number and/or types of entropy decoding operations on segments of the encoded video data 156 to generate reconstructed quantization index vectors. The inverse transform engine 138(2) performs any number and/or types of inverse SQ operations and/or inverse TCQ operations on each reconstructed quantization index vector to generate a corresponding reconstructed transform block. The inverse transform engine 138(2) applies any number and/or types of inverse transforms to each reconstructed transform block to generate a corresponding reconstructed block of prediction residues. The prediction/reconstruction engine 194 implements any number and/or types of data decompression techniques on the reconstructed blocks of prediction residues to generate blocks of reconstructed video data.

Please note that the techniques described herein are illustrative rather than restrictive and can be altered without departing from the broader spirit and scope of the invention. Many modifications and variations on the functionality provided by the CDN 170, the encoder 120, the prediction engine 122, the transform engine 130, the quantization engine 140, the entropy coding engine 150, the inverse quantization engine 148(1), the inverse transform engine 138(1), the reconstruction engine 160, the decoder 190, the entropy decoding engine 158, the inverse quantization engine 148(2), the inverse transform engine 138(2), the prediction/reconstruction engine 194, and the endpoint application 198 will be apparent to those of ordinary skill in the art without departing from the scope and spirit of the described embodiments.

It will be apparent to one skilled in the art that the inventive concepts may be practiced without one or more of these specific details. The storage, organization, amount, and/or types of data described herein are illustrative rather than restrictive and can be altered without departing from the broader spirit and scope of the embodiments. In that regard, many modifications and variations on the source video data 102, the metadata database 128, the transform blocks, the quantization index vectors, and the encoded video data 156 as described herein will be apparent to those of ordinary skill in the art without departing from the scope and spirit of the described embodiments.

It will be appreciated that the system 100 shown herein is illustrative and that variations and modifications are possible. For example, the functionality provided by the CDN 170, the encoder 120, the prediction engine 122, the transform engine 130, the quantization engine 140, the entropy coding engine 150, the inverse quantization engine 148(1), the inverse transform engine 138(1), the reconstruction engine 160, the decoder 190, the entropy decoding engine 158, the inverse quantization engine 148(2), the inverse transform engine 138(2), the prediction/reconstruction engine 194, and the endpoint application 198 as described herein can be integrated into or distributed across any number of software applications (including one), hardware devices (e.g., a hardware-based encoder), and any number of components of the system 100. Further, the connection topology between the various units in FIG. 1 can be modified as desired.

In some alternate embodiments, the metadata database 128 is replaced with a metadata engine and the techniques described herein are modified accordingly. The metadata engine determines, stores, and provides on-demand to any number and/or types of components any amount and/or types of contextual metadata, any amount and/or types of quantization metadata, any amount and/or types of other metadata, or any combination thereof in any technically feasible fashion.

For instance, in some embodiments, the prediction engine 122 transmits blocks of prediction residues and/or any amount and/or types of metadata associated with blocks of prediction residues to the metadata engine. The transform engine 130 transmits transform blocks and/or any amount and/or types of metadata associated with transform blocks to the metadata engine. The metadata engine stores any amount (including none) of metadata received from the prediction engine 122 and/or the transform engine 130 as contextual metadata. The metadata engine computes any amount (including none) of contextual metadata based on blocks of prediction residues, metadata associated with blocks of prediction residues, transform blocks, metadata associated with transform blocks, or any combination thereof. In the same or other embodiments, the quantization engine 140 transmits quantization index vectors and any amount and/or types of associated metadata to the metadata engine. The metadata engine stores any amount (including none) of metadata received from the quantization engine 140 as quantization metadata, The metadata engine computes any amount (including none) of quantization metadata based on the quantization index vectors and any amount and/or types of associated metadata.

Figure 2:
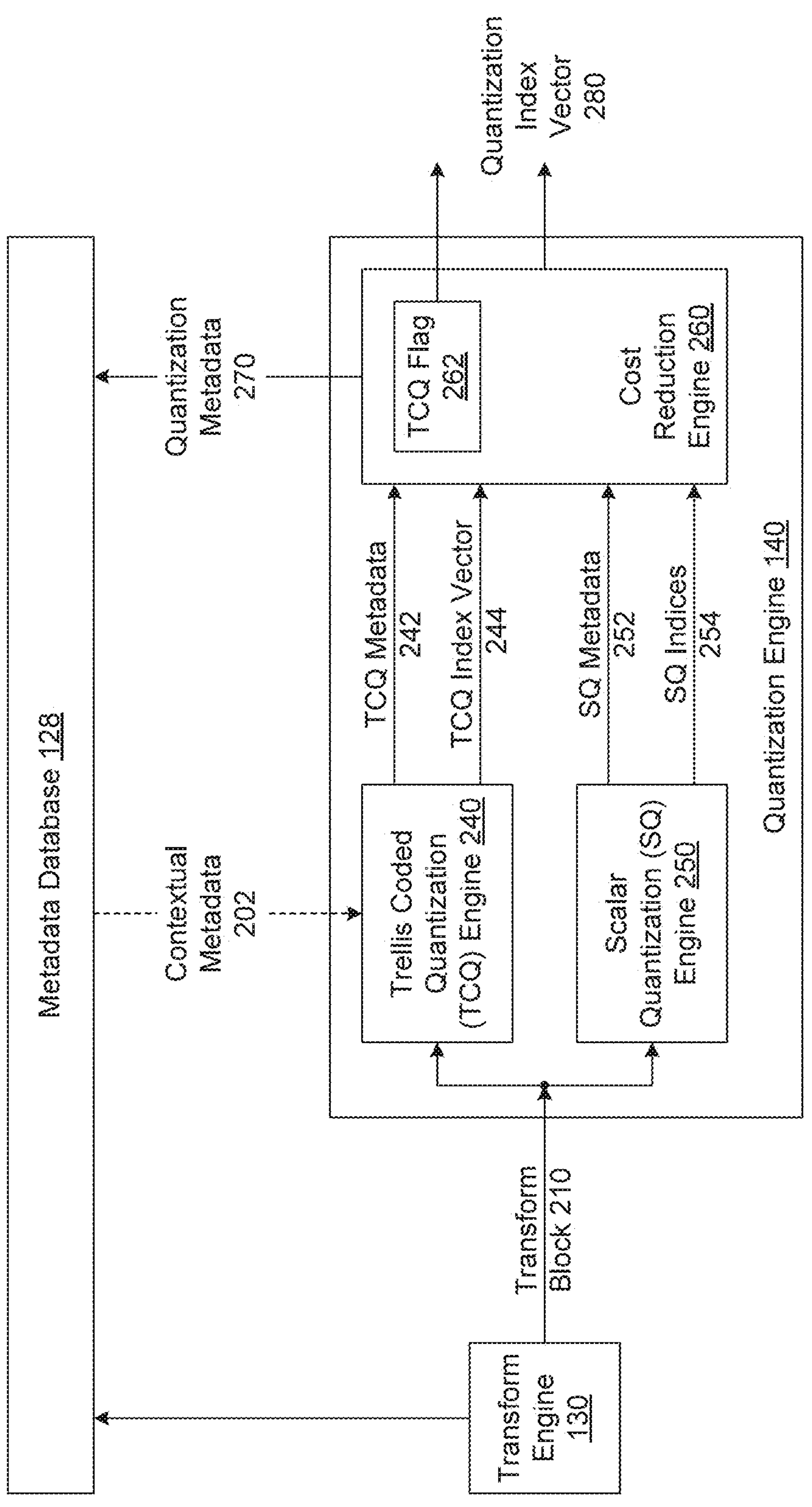
FIG. 2 is a more detailed illustration of the quantization engine of FIG. 1, according to various embodiments.

FIG. 2 is a more detailed illustration of the quantization engine 140 of FIG. 1, according to various embodiments. For explanatory purposes, the functionality of the quantization engine 140 is described in the context of generating a quantization index vector 280, any amount and/or types (including none) of quantization metadata 270, and a TCQ flag 262 based on a transform block 210 and optionally any amount and/or types of contextual metadata 202.

As shown, the transform engine 130 generates the transform block 210 and any portion of the contextual metadata 202. The transform block 210 includes, without limitation, any number of transform coefficients of prediction residues associated with a block of the source video data 102. The contextual metadata 202 can include, without limitation, any amount and/or types of data associated with the transform block 210, the transform coefficients included in the transform block 210, any number of other transform blocks, any number of frames of the source video data 102, any number of slices of the source video data 102, or any other type of data associated with and/or relevant to encoding the source video data 102. The quantization engine 140 can obtain the contextual metadata 202 in any technically feasible fashion. For instance, as depicted with a dashed arrow, in some embodiments, the transform engine 130 stores the contextual metadata 202 in the metadata database 128, and the quantization engine 140 acquires (e.g., retrieves, reads) any amount and/or types of contextual metadata 202 from the metadata database 128.

As shown, in some embodiments, the quantization engine 140 includes, without limitation, a scalar quantization (SQ) engine 250, a trellis coded quantization (TCQ) engine 240, and a cost reduction engine 260. The SQ engine 250 generates SQ indices 254 and any amount (including none) and/or types of SQ metadata 252 based on the transform block 210. In operation, the SQ engine 250 individually applies any number and/or types of SQ operations and optionally any number and/or types of rate-distortion optimized quantization (RDOQ) operations to each transform coefficient included in the transform block 210 to generate SQ indices 254 and any amount and/or types of SQ metadata 252.

The SQ indices 254 include, without limitation, a different SQ index for each transform coefficient included in the transform block 210. As used herein, an SQ index refers to a quantization index generated, at least in part, using SQ, and SQ metadata 252 refers to quantization metadata associated with any number of SQ indices. The SQ indices 254 are also referred to herein collectively as "quantization indices" and individually as a "quantization index." The SQ metadata 252 is also referred to herein as "quantization metadata." Some examples of SQ metadata 252 that the SQ engine 250 can compute for each transform block 210 are an end-of-block (EOB) position, a highest absolute index value, a number of consecutive zeros for quantization indices at scan positions before the EOB position, a sum or average of absolute values of all quantization indices at or before the EOB position. As persons skilled in the art will recognize, an "EOB position" for a given transform block refers to the position of the last non-zero quantization index for the transform block.

RDOQ operations can modify an SQ index based on an SQ cost function (not shown) that represents a tradeoff between an estimated number of bits or "rate" required by the entropy coding engine 150 to encode a quantization index and an estimated distortion associated with the quantization index. As persons skilled in the art will recognize, the rate is correlated to entropy coding efficiency, and therefore the SQ cost function represents a tradeoff between an estimated entropy coding efficiency associated with the quantization index and an estimated distortion associated with the quantization index. Notably, either the distortion or the rate is weighted by an SQ RD multiplier. The SQ cost function is an example of a rate-distortion (RD) cost function.

As used herein, "distortion" associated with one or more quantization indices refers to an error between reconstruction value(s) of the one or more quantization indices and the corresponding transform coefficient(s). In some embodiments, a distortion associated with a quantization index is equal to an absolute difference between the reconstruction value of the quantization index and the corresponding transform coefficient. In the same or other embodiments, a distortion associated with a sequence or "vector" of quantization indices (e.g., corresponding to the transform block 210) is equal to the mean squared error between the reconstruction values of the vector of quantization indices and the corresponding transform coefficients.

As shown, the TCQ engine 240 generates a TCQ index vector 244 and any amount (including none) and/or types of TCQ metadata 242 based on the transform block 210 and optionally (depicted via a dashed arrow) any amount and/or types of contextual metadata 202. In operation, the TCQ engine 240 reorganizes the transform coefficients included in the transform block 210 into a one-dimensional vector or "sequence" of transform coefficients in accordance with a predefined coding order. The TCQ engine 240 then applies any number and/or types of TCQ operations to the vector of transform coefficients to generate the TCQ index vector 244 and any amount (including none) and/or types of TCQ metadata 242.

The TCQ index vector 244 includes, without limitation, a different TCQ index for each transform coefficient included in the transform block 210. As used herein, a TCQ index refers to a quantization index generated, at least in part, using TCQ, and TCQ metadata 242 refers to quantization metadata associated with any number of TCQ indices. TCQ indices included in the TCQ index vector 244 are also referred to herein collectively as "quantization indices" and individually as a "quantization index." The TCQ metadata 242 is also referred to herein as "quantization metadata."

The TCQ engine 240 incrementally generates and evaluates with respect to a TCQ cost function (not shown) different possible permutations of the TCQ index vector 244 based on the vector of transform coefficients and any amount and/or types of the contextual metadata 202. The TCQ cost function represents a tradeoff between an estimated number of bits or rate required by the entropy coding engine 150 to encode the TCQ index vector 244 and a distortion associated with the TCQ index vector 244. As persons skilled in the art will recognize, the rate is correlated to entropy coding efficiency, and therefore the TCQ cost function represents a tradeoff between an estimated entropy coding efficiency associated with the TCQ index vector 244 and an estimated distortion associated with the TCQ index vector 244. Notably, either the distortion or the rate is weighted by a TCQ RD multiplier that is a scaled version of the SQ RD multiplier. The TCQ cost function is an example of a rate-distortion (RD) cost function. The TCQ engine 240 is described in greater detail below in conjunction with FIGS. 6, 9A, and 9B.

As shown, the cost reduction engine 260 generates a quantization index vector 280, a TCQ flag 262, and optionally any amount and/or types of quantization metadata 270 based on the SQ indices 254, the TCQ index vector 244, optionally the SQ metadata 252, and optionally the TCQ metadata 242. More specifically, the cost reduction engine 260 reorganizes the SQ indices 254 into an SQ index vector (not shown) in accordance with the predefined coding order. The cost reduction engine 260 uses a single RD cost function to compute an SQ RD cost function value (not shown) and a TCQ cost function value (not shown) based on the SQ index vector and the TCQ index vector 244, respectively. The SQ RD cost function value is a value of the RD cost function when applied to the SQ index vector. The TCQ cost function value is a value of the RD cost function when applied to the TCQ index vector 244. The RD cost function can be a weighted sum of reconstruction errors and estimated coding rates or any other RD cost function.

The cost reduction engine 260 sets the TCQ flag 262 equal to (the TCQ cost function value<the SQ cost function value). If the TCQ flag 262 is true, then the cost reduction engine 260 sets the quantization index vector 280 equal to the TCQ index vector 244 and determines the quantization metadata 270 based on the TCQ metadata 242 and optionally the TCQ cost function value. The cost reduction engine 260 can determine the quantization metadata 270 in any technically feasible fashion. For instance, in some embodiments, the cost reduction engine 260 sets the quantization metadata 270 equal to the TCQ metadata 242.

If the TCQ flag 262 is false, then the cost reduction engine 260 sets the quantization index vector 280 equal to the SQ index vector and determines the quantization metadata 270 based on the SQ metadata 252 and optionally the SQ cost function value. The cost reduction engine 260 can determine the quantization metadata 270 in any technically feasible fashion. For instance, in some embodiments, the cost reduction engine 260 sets the quantization metadata 270 equal to the SQ metadata 252.

As shown, the cost reduction engine 260 optionally stores the quantization metadata 270 in the metadata database 128. The cost reduction engine 260 transmits the quantization index vector 280 and the TCQ flag 262 to the entropy coding engine 150 for entropy coding and transmission to decoders (e.g., the decoder 190) as part of the encoded video data 156. Referring back to FIG. 1, the inverse quantization engine 148(1) and the inverse quantization engine 148(2) use the TCQ flag 262 to determine whether to reconstruct each transform block in accordance with SQ or TCQ.

Figure 3:
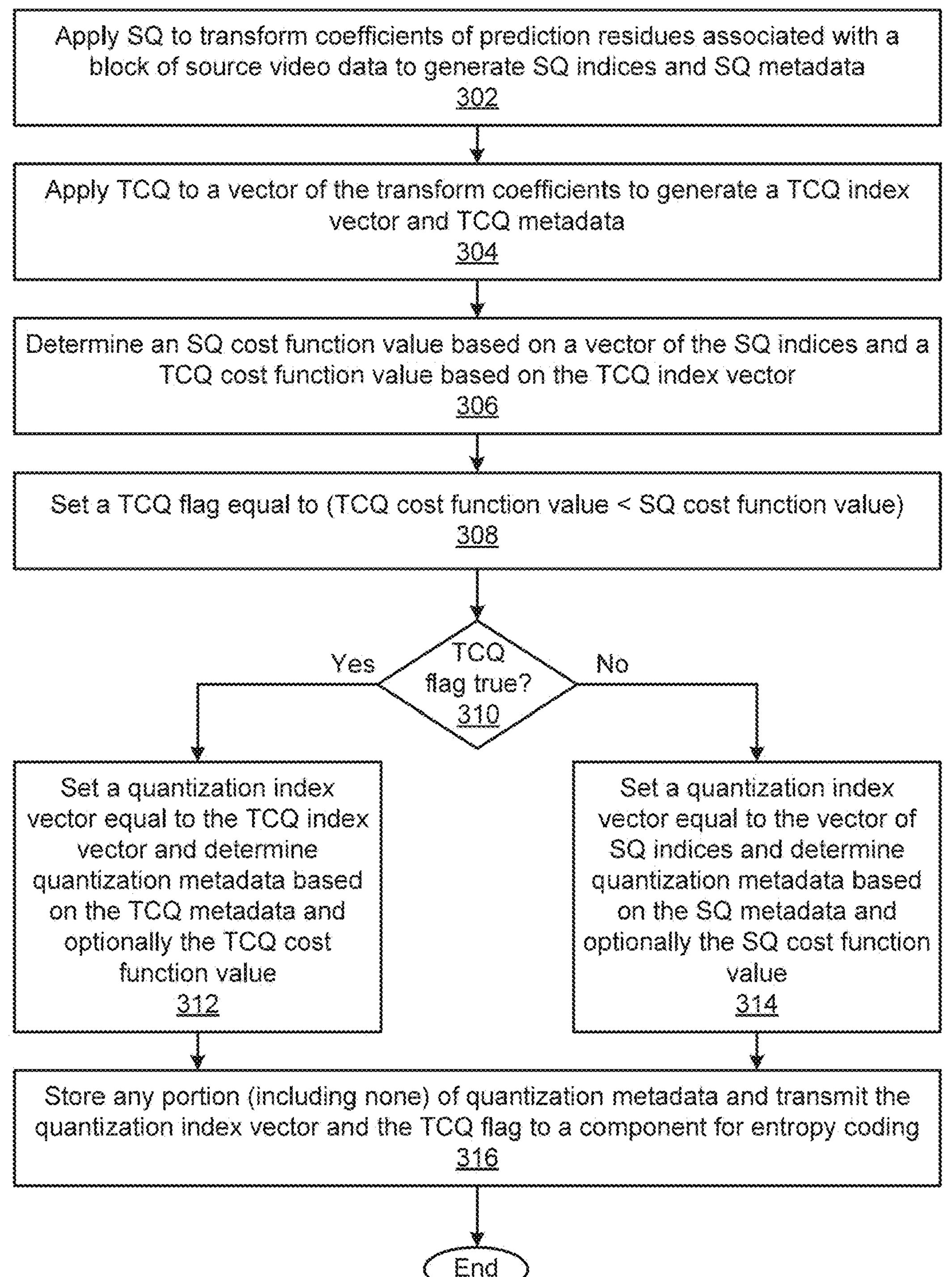
FIG. 3 is a flow diagram of method steps for performing both scalar and trellis coded quantization when encoding video data, according to various embodiments.

FIG. 3 is a flow diagram of method steps for performing both scalar and trellis coded quantization when encoding video data, according to various embodiments. Although the method steps are described with reference to the systems of FIGS. 1-2, persons skilled in the art will understand that any system configured to implement the method steps, in any order, falls within the scope of the embodiments.

As shown, a method 300 begins at step 302, where the SQ engine 250 applies SQ to transform coefficients of prediction residues associated with a block of source video data to generate SQ indices 254 and SQ metadata 252. At step 304, the TCQ engine 240 applies TCQ to a vector of the transform coefficients to generate TCQ index vector 244 and TCQ metadata 242.

At step 306, the cost reduction engine 260 determines an SQ cost function value based on a vector of the SQ indices 254 and a TCQ cost function value based on the TCQ index vector 244. At step 308, the cost reduction engine 260 sets TCQ flag 262 equal to (TCQ cost function value<SQ cost function value). At step 310, the cost reduction engine 260 determines whether the TCQ flag 262 is true.

If, at step 310, the cost reduction engine 260 determines that the TCQ flag 262 is true, then the method 300 proceeds to step 312. At step 312, the cost reduction engine 260 sets quantization index vector 280 equal to the TCQ index vector 244 and determines the quantization metadata 270 based on the TCQ metadata 242 and optionally the TCQ cost function value. The method 300 then proceeds directly to step 316.

If, however, at step 310, the cost reduction engine 260 determines that the TCQ flag 262 is false, then the method 300 proceeds directly to step 314. At step 314, the cost reduction engine 260 sets quantization index vector 280 equal to the vector of SQ indices 254 and determines quantization metadata 270 based on the SQ metadata 252 and optionally the SQ cost function value.

At step 316, the cost reduction engine 260 stores any portion (including none) of the quantization metadata 270 and transmits the quantization index vector 280 and the TCQ flag 262 to a component for entropy coding. The method 300 then terminates.

Figure 4:
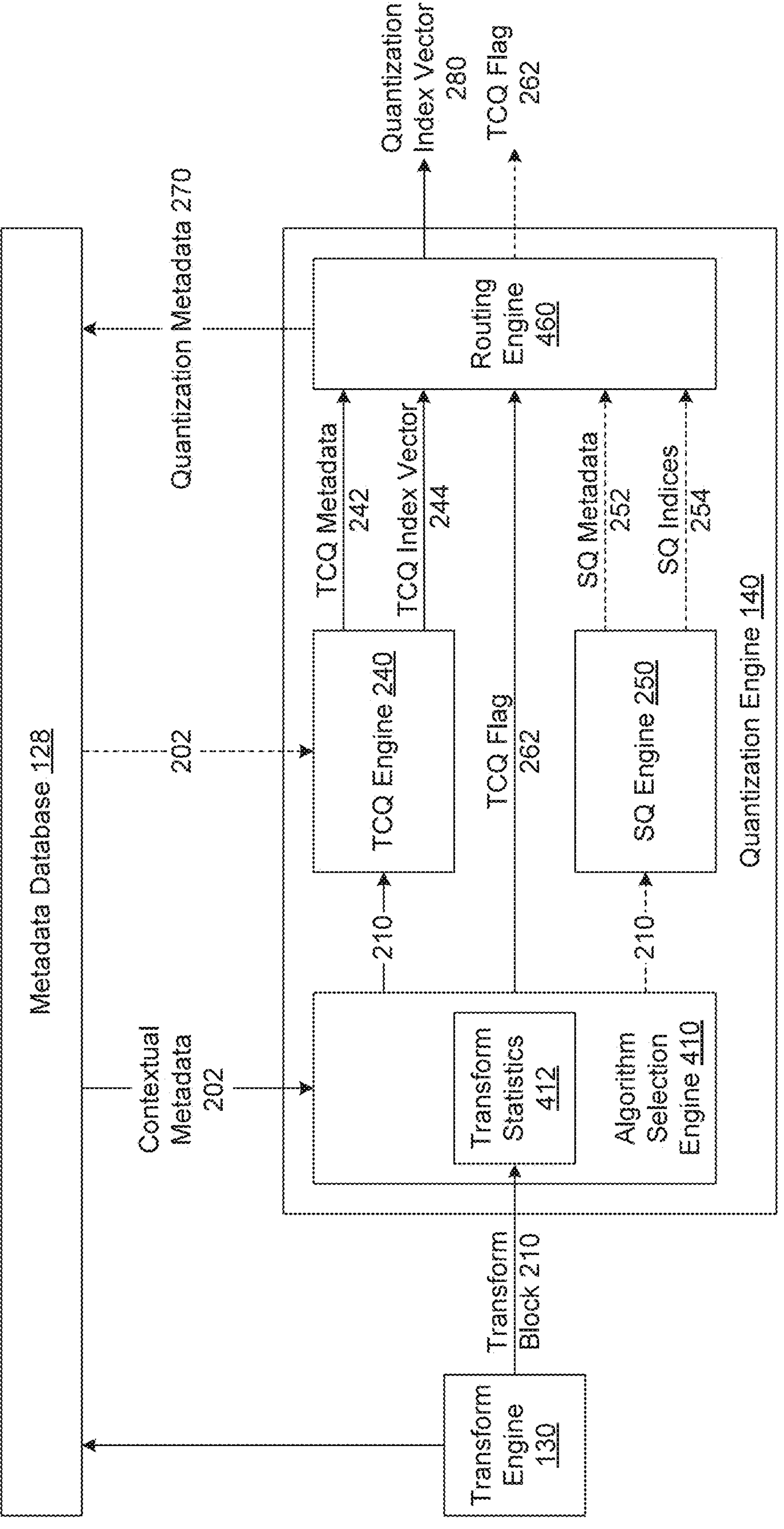
FIG. 4 is a more detailed illustration of the quantization engine of FIG. 1, according to other various embodiments.

FIG. 4 is a more detailed illustration of the quantization engine of FIG. 1, according to other various embodiments. For explanatory purposes, the functionality of the quantization engine 140 is described in the context of generating the quantization index vector 280, any amount and/or types (including none) of quantization metadata 270, and optionally (as depicted via a dashed arrow) the TCQ flag 262 based on a transform block 210 and optionally any amount and/or types of contextual metadata 202.

As described previously herein in conjunction with FIG. 2, the transform engine 130 generates the transform block 210 and any portion of the contextual metadata 202. The transform block 210 includes, without limitation, any number of transform coefficients of prediction residues associated with a block of the source video data 102. The contextual metadata 202 can include, without limitation, any amount and/or types of data associated with the transform block 210, the transform coefficients included in the transform block 210, any number of other transform blocks, any number of frames of the source video data 102, any number of slices of the source video data 102, or any other type of data associated with and/or relevant to encoding the source video data 102. The quantization engine 140 can obtain the contextual metadata 202 in any technically feasible fashion. For instance, as depicted with a dashed arrow, in some embodiments, the transform engine 130 stores the contextual metadata 202 in the metadata database 128, and the quantization engine 140 acquires (e.g., retrieves, reads) any amount and/or types of contextual metadata 202 from the metadata database 128.

As shown, in some embodiments, the quantization engine 140 includes, without limitation, an algorithm selection engine 410, the SQ engine 250, the TCQ engine 240, and a routing engine 460. The algorithm selection engine 410 optionally computes any number and/or types of transform statistics 412 based on the transform coefficients included in the transform block 210. Some examples of the transform statistics 412 are block-wise signal energy, number of transform coefficients with absolute values above a given threshold, and maximum length of consecutive transform coefficients with values below a given threshold.

The algorithm selection engine 410 then sets the TCQ flag 262 to indicate whether to apply TCQ or SQ to the transform block 210 based on at least one of contextual metadata 202 associated with the transform block 210 or the transform statistics 412. Some examples of contextual metadata 202 that the algorithm selection engine 410 can use to determine the value of the TCQ flag 262 are transform type, scan type, and quantization parameter level.

For instance, in some embodiments, if the transform block 210 is a two-dimensional DCT block and has at least a predetermined number of transform coefficients with absolute values above a given threshold, then the algorithm selection engine 410 sets the TCQ flag 262 to true, thereby indicating that TCQ is to be applied to the transform block 210. Otherwise, the algorithm selection engine 410 sets the TCQ flag 262 to false, thereby indicating that SQ is to be applied to the transform block 210.

If the algorithm selection engine 410 sets the TCQ flag 262 to true, then the quantization engine 140 configures the TCQ engine 240 to generate the TCQ index vector 244 and any amount (including none) and/or types of TCQ metadata 242 based on the transform block 210 and optionally (depicted via a dashed arrow) any amount and/or types of contextual metadata 202. The TCQ engine 240, the TCQ index vector 244 and the TCQ metadata 242 were described previously herein in conjunction with FIG. 2. The TCQ engine 240 is described in greater detail below in conjunction with FIGS. 6, 8A, and 9B.

If, however, the algorithm selection engine 410 sets the TCQ flag 262 to false (and as depicted via dashed arrows), then the quantization engine 140 configures the SQ engine 250 to generate the SQ indices 254 and any amount (including none) and/or types of SQ metadata 252 based on the transform block 210, The SQ engine 250, the SQ indices 254, and the SQ metadata 252 were described previously herein in conjunction with FIG. 2.

If the TCQ flag 262 is true, then the routing engine 460 sets the quantization index vector 280 equal to the TCQ index vector 244 and optionally sets the quantization metadata 270 equal to the TCQ metadata 242. Otherwise, the routing engine 460 reorganizes the SQ indices 254 into the quantization index vector 280 in accordance with the predefined coding order and optionally sets the quantization metadata 270 equal to the SQ metadata 252.

As depicted with a dashed line, the routing engine 460 optionally stores the quantization metadata 270 in the metadata database 128. The routing engine transmits the quantization index vector 280 to the entropy coding engine 150 for entropy coding and transmission to decoders (e.g., the decoder 190) as part of the encoded video data 156. If the algorithm selection engine 410 generated any transform statistics 412, then the routing engine 460 transmits the TCQ flag 262 to the entropy coding engine 150 for entropy coding and transmission to decoders (e.g., the decoder 190) as part of the encoded video data 156.

In that regard, decoders do not typically have access to the transform statistics 412. Therefore, if the algorithm selection engine 410 determines the TCQ flag 262 based on the transform statistics 412, then decoders require the TCQ flag 262 or another explicit signal to determine whether to reconstruct the transform block 210 in accordance with SQ or TCQ. For instance, referring back to FIG. 1, the inverse quantization engine 148(1) and the inverse quantization engine 148(2) use the TCQ flag 262 to determine whether to reconstruct each transform block in accordance with SQ or TCQ.

If, however, the algorithm selection engine 410 did not generate any transform statistics 412, then the routing engine 460 does not transmit the TCQ flag 262 to the entropy coding engine 150. In that regard, if the algorithm selection engine 410 did not generate any transform statistics 412, then inverse quantization engines (e.g., the inverse quantization engine 148(1) and the inverse quantization engine 148(2)) can implement the same process as the quantization engine to reconstruct the TCQ flag 262.

Figure 5:
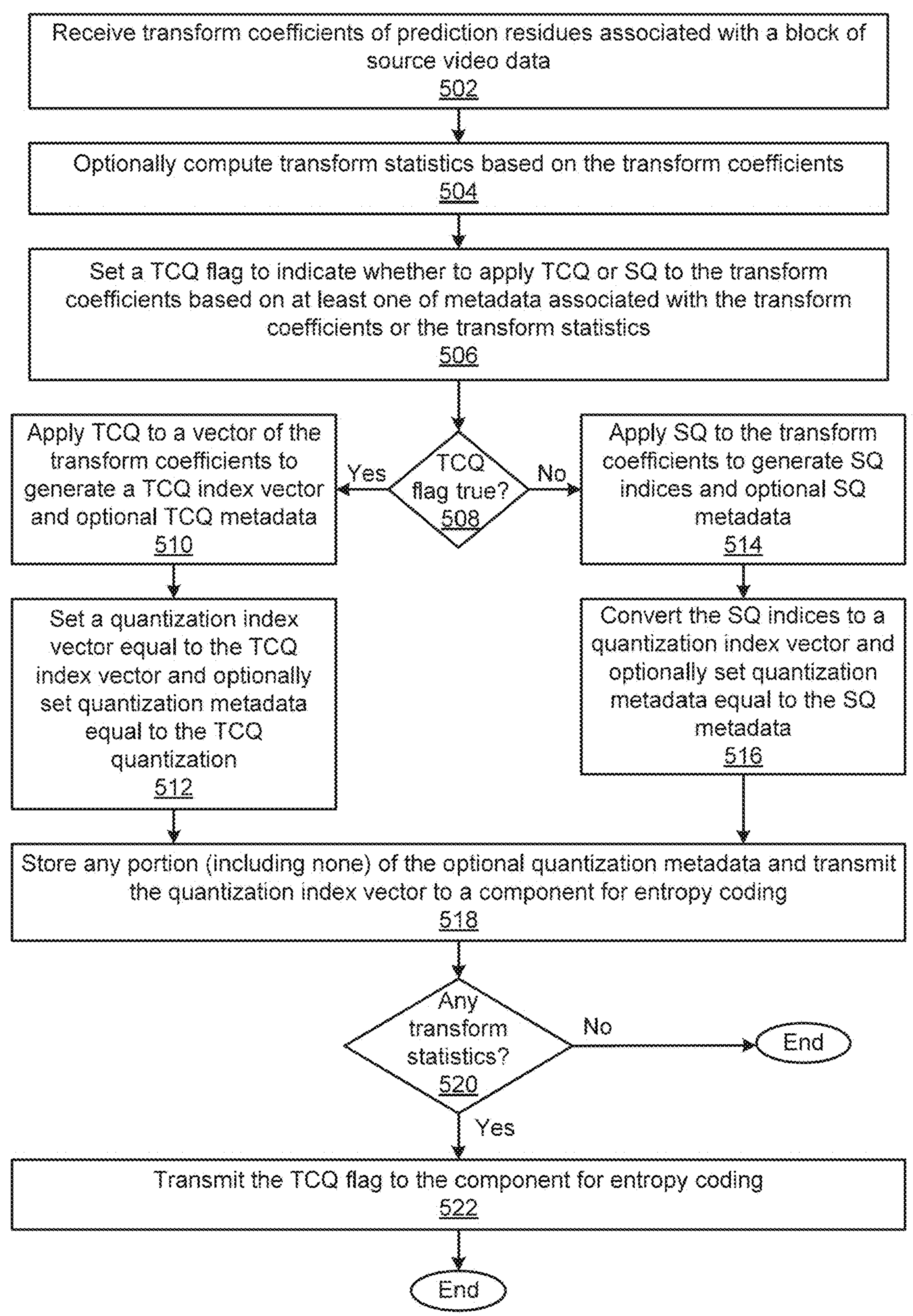
FIG. 5 is a flow diagram of method steps for selecting between scalar quantization and trellis coded quantization when encoding video data, according to various embodiments.

FIG. 5 is a flow diagram of method steps for selecting between scalar quantization and trellis coded quantization when encoding video data, according to various embodiments. Although the method steps are described with reference to the systems of FIGS. 1 and 4, persons skilled in the art will understand that any system configured to implement the method steps, in any order, falls within the scope of the embodiments.

As shown, a method 500 begins at step 502, where the quantization engine 140 receives transform coefficients of prediction residues associated with a block of source video data. At step 504, the algorithm selection engine 410 optionally computes transform statistics 412 based on the transform coefficients. At step 506, the algorithm selection engine 410 set TCQ flag 262 to indicate whether to apply TCQ or SQ to the transform coefficients based on at least one of metadata associated with the transform coefficients or the transform statistics 412. At step 508, the algorithm selection engine 410 determines whether the TCQ flag 262 is true.

If, at step 508, the algorithm selection engine 410 determines that the TCQ flag 262 is true, then the method 500 proceeds to step 510. At step 510, the TCQ engine 240 applies TCQ to a vector of the transform coefficients to generate TCQ index vector 244 and optional TCQ metadata 242. At step 512, the routing engine 460 sets the quantization index vector 280 equal to the TCQ index vector 244 and optionally sets the quantization metadata 270 equal to the TCQ metadata 242. The method 500 then proceeds directly to step 518.

If, however, at step 508, the algorithm selection engine 410 determines that the TCQ flag 262 is false, then the method 500 proceeds directly to step 514. At step 514, the SQ engine 250 applies SQ to the transform coefficients to generate SQ indices 254 and optional SQ metadata 252. At step 516, the routing engine 460 converts the SQ indices 254 to quantization index vector 280 and optionally sets the quantization metadata 270 equal to the SQ metadata 252.

At step 518, the routing engine 460 stores any portion (including none) of the optional quantization metadata 270 and transmits the quantization index vector 280 to a component for entropy coding. At step 520, the routing engine 460 determines whether the algorithm selection engine 410 generated any transform statistics 412. If, at step 520, the routing engine 460 determines that the algorithm selection engine 410 did not generate any transform statistics 412, then the method 500 terminates.

If, however, at step 520, the routing engine 460 determines that the algorithm selection engine 410 generated transform statistics 412, then the method 500 proceeds to step 522. At step 522, the routing engine 460 transmits the TCQ flag 262 to the component for entropy coding. The method 500 then terminates.

Figure 6:
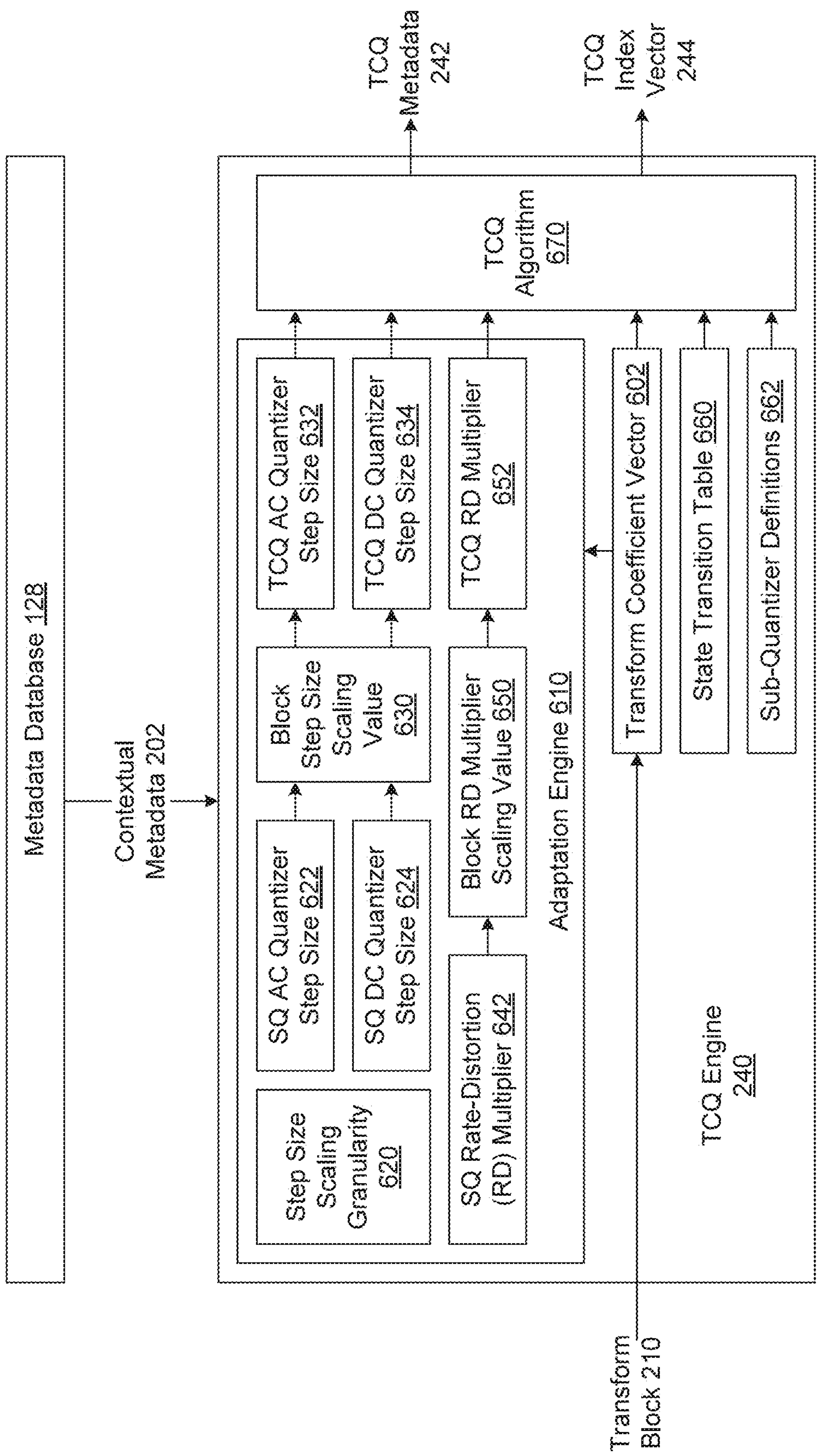
FIG. 6 is a more detailed illustration of the trellis coded quantization engine of FIGS. 2 and 4, according to various embodiments.

FIG. 6 is a more detailed illustration of the TCQ engine 240 of FIGS. 2 and 4, according to various embodiments. For explanatory purposes, the functionality of the TCQ engine 240 is described in the context of generating the TCQ index vector 244 and any amount and/or types (including none) of TCQ metadata 242 based on the transform block and optionally any amount and/or types of contextual metadata 202.

As described previously herein in conjunction with FIG. 2, the transform block 210 includes, without limitation, any number of transform coefficients of prediction residues associated with a block of the source video data 102. The contextual metadata 202 can include, without limitation, any amount and/or types of data associated with the transform block 210, the transform coefficients included in the transform block 210, any number of other transform blocks, any number of frames of the source video data 102, any number of slices of the source video data 102, or any other type of data associated with and/or relevant to encoding the source video data 102. The quantization engine 140 can obtain the contextual metadata 202 in any technically feasible fashion. For instance, as depicted with a dashed arrow, the quantization engine 140 acquires (e.g., retrieves, reads) any amount and/or types of contextual metadata 202 from the metadata database 128.

As shown, in some embodiments, the TCQ engine 240 includes, without limitation, a transform coefficient vector 602, sub-quantizer definitions 662, a state transition table 660, a TCQ algorithm 670, and an adaptation engine 610. The TCQ engine 240 reorganizes the transform coefficients included in the transform block 210 into the transform coefficient vector 602 in accordance with a predefined coding order. The transform coefficient vector 602 is a one-dimensional vector of transform coefficients.

The sub-quantizer definitions 662 define reconstruction levels and corresponding quantization indices for each of multiple sub-quantizers. In some embodiments, as per the sub-quantizer definitions 662, each sub-quantizer includes, without limitation, a different set of symmetric reconstruction values corresponding to different integer quantization indices and a reconstruction value of zero. Each reconstruction value is equal to the product of a different quantization index and a TCQ step size. As described in greater detail below the TCQ step size can be different for DC coefficients and AC coefficients. In many implementations, a typical transform block includes 1 DC transform coefficient and many (e.g., 63) AC transform coefficients. The DC transform coefficient represents an average value for the original block of source video data, while the AC transform coefficients represent changes across the original block. An example of sub-quantizers corresponding to an example of the sub-quantizer definitions 662 is described below in conjunction with FIG. 9B.

For a current transform coefficient and an associated current state, the state transition table 660 specifies the sub-quantizer that is to be used to quantize the current transform coefficient to generate various different possible current quantization indices. The state transition table 660 also specifies a next or "destination" state for the next transform coefficient based on the current state and the parity of a possible current quantization index. More specifically, for each current state, the state transition table 660 specifies different destination states for odd current quantization indices and even current quantization indices. An example of the state transition table 660 is described below in conjunction with FIG. 9A.

The TCQ algorithm 670 is an implementation of TCQ that, relative to TCQ algorithms that are implemented in conventional encoders, evaluates additional possible quantization indices for each transform coefficient. As shown, in some embodiments, the TCQ algorithm 670 generates the TCQ index vector 244 and any amount (including none) and types of TCQ metadata 242 based on the transform coefficient vector 602, the sub-quantizer definitions 662, the state transition table 660, a TCQ AC quantizer step size 632, a TCQ DC quantizer step size 634, and a TCQ RD multiplier 652.

The TCQ AC quantizer step size 632 and the TCQ DC quantizer step size 634 are TCQ quantizer step sizes for, respectively, AC transform coefficients and DC transform coefficient(s) included in the transform block 210. The TCQ RD multiplier 652 is a rate-distortion multiplier for trellis coded quantization and is included in the TCQ cost function (not shown). As described previously herein in conjunction with FIG. 2, the TCQ RD multiplier 652 weights either the rate term or the distortion term included in TCQ cost function. The TCQ engine 240 can determine the TCQ AC quantizer step size 632, the TCQ DC quantizer step size 634, and the TCQ RD multiplier 652 in any technically feasible fashion. For instance, in some embodiments, the adaptation engine 610 computes the TCQ AC quantizer step size 632, the TCQ DC quantizer step size 634, and the TCQ RD multiplier 652.

The TCQ algorithm 670 generates an initial version of a trellis data structure (not shown) that includes, without limitation, sequential trellis stages corresponding to the transform coefficients in the transform coefficient vector 602. An initial trellis stage corresponding to the initial transform coefficient in the transform coefficient vector 602 includes an uncoded state and a different state for each sub-quantizer as per the sub-quantizer definitions 662. In the context of the trellis data structure, a state is also referred to herein as a "trellis state." Each subsequent trellis stage includes an uncoded state and each state represented by the state transition table 660. With the exception of the uncoded state in the last trellis stage, TCQ algorithm 670 connects each uncoded state to the uncoded state in the next trellis stage using a different branch. The TCQ algorithm 670 assigns a cumulative cost function value of zero to each state in the initial trellis stage and to each uncoded state. As used herein, a cumulative cost function value associated with a given state in a given trellis state is a value for the TCQ cost function when applied to a permutation of a portion of the TCQ index vector 244 that corresponds to a path from the initial trellis stage to the given state in the given trellis stage.

The TCQ algorithm 670 sequentially executes a quantization evaluation process for each transform coefficient included in the transform coefficient vector 602 based on the trellis data structure, the state transition table 660, and the sub-quantizers as per the sub-quantizer definitions 662. To execute the quantization evaluation process for a current transform coefficient, the TCQ algorithm 670 selects the corresponding trellis stage. For each state in the selected trellis stage, the TCQ algorithm 670 selects a sub-quantizer based on the state transition table 660. For each state in the selected trellis stage, the TCQ algorithm 670 computes a cumulative cost function value for each of the current transform coefficient at zero, coding the current transform coefficient with the selected sub-quantizer at the closest non-zero quantization index with even parity, and coding the current transform coefficient with the selected sub-quantizer at the closest non-zero quantization index with odd parity.

As persons skilled in the art will recognize, conventional TCQ algorithms typically evaluate the current transform coefficient at zero and at the closest non-zero quantization index irrespective of the parity of the closest non-zero quantization index. By contrast, with the disclosed techniques, the TCQ algorithm 670 evaluates an additional possible quantization index for each state included in each trellis state. Advantageously, evaluating additional possible quantization indices extends the set of possible reconstruction values (and the corresponding cumulative cost function values) explored at each trellis stage. As a result, the TCQ algorithm 670 can generate TCQ index vector 244 that has a lower communicative cost function value relative to TCQ index vectors generated using conventional TCQ algorithms.

The TCQ algorithm 670 updates the trellis data structure with new branches corresponding to the quantization indices and the associated cumulative cost function values computed for the different states in the selected trellis stage. Each of the new branches connects a different combination of a state in the selected trellis stage and a "destination" state in a next trellis stage. For each destination state in the next trellis stage, the TCQ algorithm 670 retains the trellis branch associated with the lowest cumulative cost function value, prunes any other trellis branches, and assigns the lowest cumulative cost function value to the destination state. After the TCQ algorithm 670 finishes executing the quantization evaluation process for the last transform coefficient included in the transform coefficient vector 602, the TCQ algorithm 670 selects a path that has the lowest cumulative cost function value through all trellis stages. The TCQ algorithm 670 generates the TCQ index vector 244 that includes the quantization indices corresponding to the selected path. The TCQ algorithm 670 optionally generates any amount and/or types of TCQ metadata 242 associated with the quantization process. Some examples of TCQ metadata 242 are parities of quantization indices, the trellis states associated with quantization indices, and the sub-quantizers used to generate quantization indices.

Note that inverse TCQ engines included in decoders can sequentially compute reconstructed quantization indices included in a reconstructed quantization index vector according to the state transition table 660 and the sub-quantization definitions 662. More specifically and referring back to FIG. 1, in some embodiments, instances of an inverse TCQ engine included in the inverse quantization engine 148(1) and the inverse quantization engine 148(2) can sequentially compute reconstructed quantization indices included in a reconstructed quantization index vector according to the state transition table 660 and the sub-quantization definitions 662.

In some embodiments, the adaptation engine 610 generates the TCQ AC quantizer step size 632, the TCQ DC quantizer step size 634, and the TCQ RD multiplier 652 based on the transform block 210 and any amount and/or types of contextual metadata 202 associated with the transform block 210. The adaptation engine 610 can acquire the contextual metadata 202 in any technically feasible fashion. As shown, in some embodiments, the adaptation engine 610 retrieves the contextual metadata 202 from the metadata database 128.

In some embodiments, the adaptation engine 610 adaptively scales an SQ AC quantizer step size 622 and an SQ DC quantizer step size 624 to generate, respectively, the TCQ AC quantizer step size 632 and the TCQ DC quantizer step size 634. The SQ AC quantizer step size 622 and the SQ DC quantizer step size 624 are quantizer step sizes for, respectively, AC transform coefficients and DC transform coefficient(s) included in the transform coefficient vector 602. The adaptation engine 610 implements TCQ step sizing according to a step size scaling granularity 620. For instance, the step size scaling granularity could be per-frame, per-slice, per block, etc.

The adaptation engine 610 can determine the SQ AC quantizer step size 622, the SQ DC quantizer step size 624, and the step size scaling granularity 620 in any technically feasible fashion. For example, in some embodiments, the step size scaling granularity 620 is predefined and the adaptation engine 610 selects the SQ AC quantizer step size 622 and the SQ DC quantizer step size 624 from the contextual metadata 202 that applies to the transform coefficient vector 602 based on the step size scaling granularity 620.

To determine the TCQ AC quantizer step size 632 and the TCQ DC quantizer step size 634 to be used to perform TCQ on the transform coefficient vector 602, the adaptation engine 610 optionally selects a default step size scaling value (not shown) from the contextual metadata 202 that applies to the transform coefficient vector 602 based on the step size scaling granularity 620. The adaptation engine 610 computes a block step size scaling value 630 based on any amount and/or types of the contextual metadata 202 associated with the transform coefficient vector 602 and optionally the default step size scaling value and/or the default step size scaling granularity. Note that a default step size to which the default step size scaling value is applied can depend on any amount and/or types of metadata, such as bit depth of the source video data 102.

Some examples of contextual metadata 202 that the adaptation engine 610 can use to compute the block step size scaling value 630 include, without limitation, a coding plane type, frame type, slice type, position in the prediction structure, block type, block size, and transform coefficient energy levels, values of the SQ step sizes, transform coefficient positions within the transform block (e.g., AC or DC, low-frequency or default range). The adaptation engine 610 sets the TCQ AC quantizer step size 632 equal to the product of the SQ AC quantizer step size 622 and the block step size scaling value 630. The adaptation engine 610 sets the TCQ DC quantizer step size 634 equal to the product of the SQ DC quantizer step size 624 and the block step size scaling value 630.

Note that inverse TCQ engines included in decoders can implement the same process as the TCQ engine 240 to reconstruct the TCQ AC quantizer step size 632 and the TCQ DC quantizer step size 634 when reconstructing each transform block and implement an inverse of the quantization evaluation process to reconstruct each transform block. More specifically and referring back to FIG. 1, in some embodiments, instances of an inverse TCQ engine included in the inverse quantization engine 148(1) and the inverse quantization engine 148(2) can implement the same process as the TCQ engine 240 to reconstruct the TCQ AC quantizer step size 632 and the TCQ DC quantizer step size 634 when reconstructing each transform block and implement an inverse of the quantization evaluation process to reconstruct each transform block.

In the same or other embodiments, the adaptation engine 610 adaptively scales an SQ RD multiplier 642 included in the SQ cost function (not shown) to generate the TCQ RD multiplier 652 included in the TCQ cost function (not shown) based on any amount and/or types of the contextual metadata 202 associated with the transform block 210 (and therefore associated with the transform coefficient vector). As described previously herein, the SQ RD multiplier 642 and the TCQ RD multiplier 652 weight either the rate terms or the distortion terms included in, respectively, the SQ cost function and the TCQ cost function.

To determine the TCQ RD multiplier 652 to be used to perform TCQ on the transform coefficient vector 602, the adaptation engine 610 computes a block RD multiplier scaling value 650 based on any amount and/or types of the contextual metadata 202 associated with transform coefficient vector 602. Some examples of contextual metadata 202 that the adaptation engine 610 can use to compute the block RD multiplier scaling value 650 include a coding plane type (e.g., luma, chroma), frame type (inter, intra), position in the prediction structure, block type, block size, and transform coefficient energy levels. The adaptation engine 610 sets the TCQ RD multiplier 652 equal to the product of the SQ RD multiplier 642 and the block RD multiplier scaling value 650.

As persons skilled in the art will recognize, inverse quantization engines do not use a TCQ cost function to reconstruct the transform block from a decoded TCQ vector and therefore the TCQ engine 240 neither directly nor indirectly (e.g., via the entropy coding engine 150) transmits the TCQ RD multiplier 652 to any decoders.

Note, that the techniques described herein are illustrative rather than restrictive. Many modifications and variations will be apparent to those of ordinary skill in the art without departing from the scope and spirit of the described embodiments and techniques. In particular, it will be apparent to one skilled in the art that any of the inventive concepts described herein may be practiced without one or more of the other inventive concepts and/or specific details described herein. For instance, in some alternate embodiments, the TCQ engine 240 can execute the TCQ algorithm 670 on the transform block 210 based on any amount and/or types of data (e.g., any number of quantizer step sizes, any number and/or types of RD multipliers) that the TCQ engine 240 can determine in any technically feasible fashion. In some embodiments, the adaptation engine 610 is omitted from the TCQ engine 240. In some other embodiments, the adaptation engine 610 computes a single TCQ quantizer step size and/or the TCQ RD multiplier 652. In yet other embodiments, the adaptation engine 610 computes any number of TCQ quantizer step sizes but does not compute the TCQ RD multiplier 652.

In some embodiments, the TCQ algorithm 670 can implement any number and/or types of techniques to generate and evaluate possible permutations of the sequence of quantization indices. For instance, in some embodiments, the TCQ algorithm 670 can implement any number and/or types of dynamic programming techniques instead of or in addition to the techniques described above.

Advantageously, because the TCQ algorithm 670 generates different possible permutations of the TCQ index vector 244, evaluates the permutations with respect to the TCQ cost function, and sets the TCQ index vector 244 equal to the permutation associated with the lowest commutative cost function value, the TCQ index vector 244 can be more effectively compressed during entropy coding relative to SQ quantitation indices corresponding to the transform block 210. In particular because the TCQ cost function accounts for entropy coding efficiency, the TCQ algorithm 670 can exploit opportunities for increased compression during entropy coding. As a result, overall encoding efficiency can be increased relative to what can be achieved using conventional scalar quantization operations.

Figure 7:
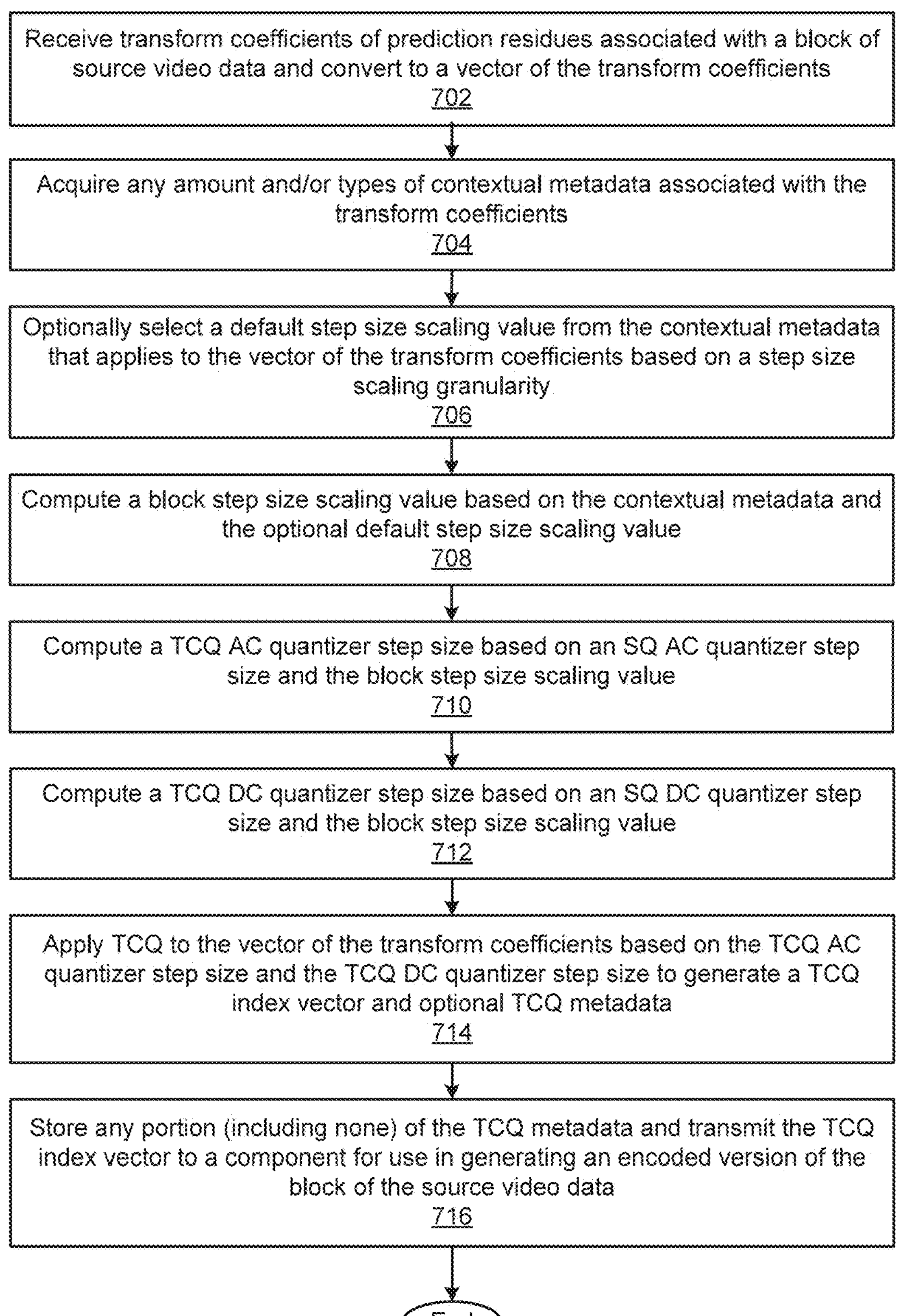
FIG. 7 is a flow diagram of method steps for scaling step sizes when performing trellis coded quantization, according to various embodiments.

FIG. 7 is a flow diagram of method steps for scaling step sizes when performing trellis coded quantization, according to various embodiments. Although the method steps are described with reference to the systems of FIGS. 1, 2, 4, and 6, persons skilled in the art will understand that any system configured to implement the method steps, in any order, falls within the scope of the embodiments.

As shown, a method 700 begins at step 702, where the TCQ engine 240 receives transform coefficients of prediction residues associated with a block of source video data and converts to a vector of the transform coefficients. At step 704, the adaptation engine 610 acquires any amount and/or types of contextual metadata 202 associated with the transform coefficients.

At step 706, the adaptation engine 610 optionally selects a default step size scaling value from the contextual metadata 202 that applies to the vector of the transform coefficients based on step size scaling granularity 620. At step 708, the adaptation engine 610 computes block step size scaling value 630 based on the contextual metadata 202 and the optional default step size scaling value. At step 710, the adaptation engine 610 computes TCQ AC quantizer step size 632 based on SQ AC quantizer step size 622 and the block step size scaling value 630. At step 712, the adaptation engine 610 computes TCQ DC quantizer step size 634 based on SQ DC quantizer step size 624 and the block step size scaling value 630.

At step 714, the TCQ algorithm 670 applies TCQ to the vector of the transform coefficients based on the TCQ AC quantizer step size 632 and the TCQ DC quantizer step size 634 to generate TCQ index vector 244 and optional TCQ metadata 242. At step 716, the TCQ engine 240 stores any portion (including none) of the TCQ metadata 242 and transmits the TCQ index vector 244 to a component for use in generating an encoded version of the block of the source video data. The method 700 then terminates.

Figure 8:
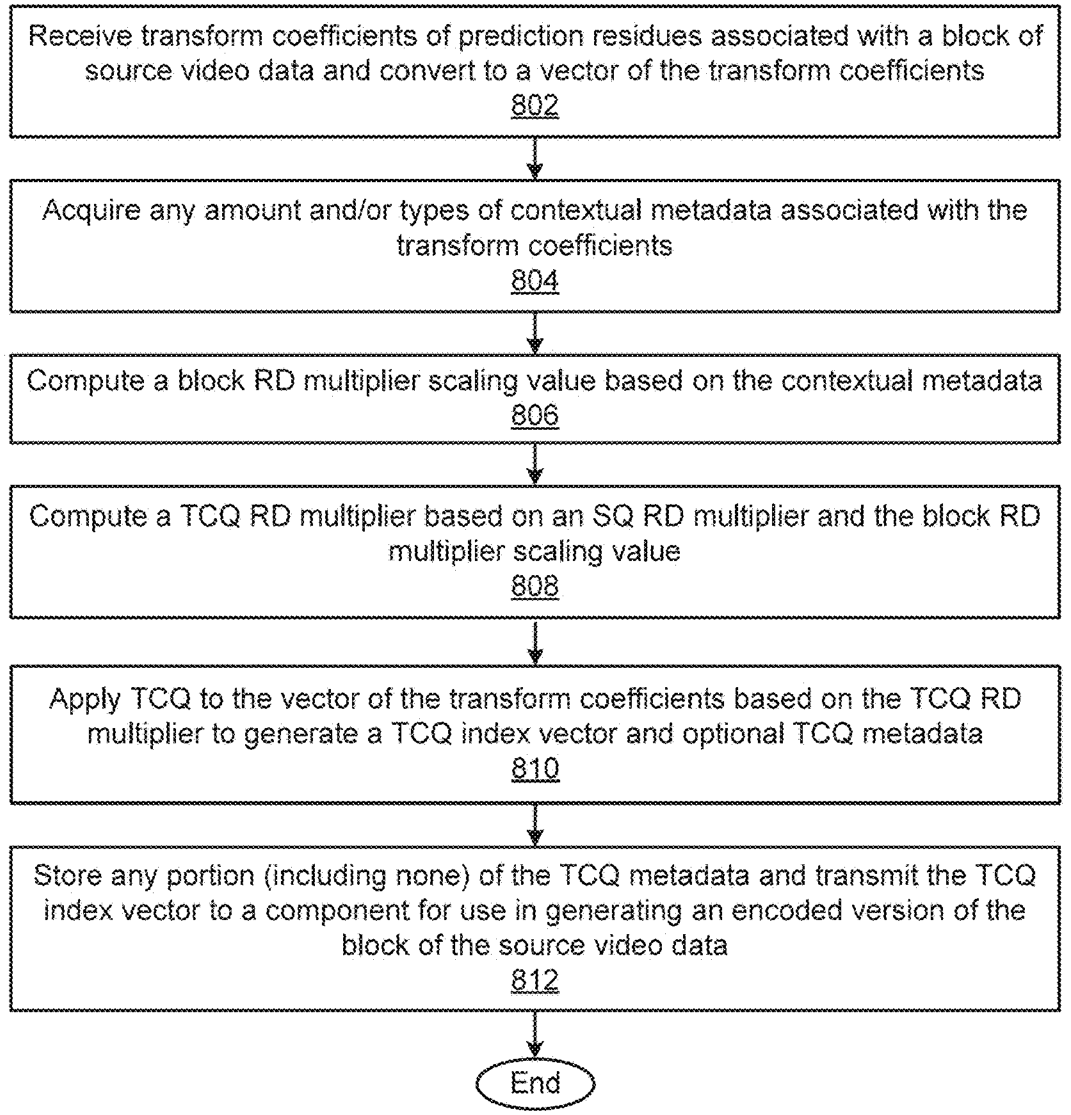
FIG. 8 is a flow diagram of method steps for scaling a rate-distortion multiplier when encoding video data, according to various embodiments.

FIG. 8 is a flow diagram of method steps for scaling a rate-distortion multiplier when encoding video data, according to various embodiments. Although the method steps are described with reference to the systems of FIGS. 1, 2, 4, and 6, persons skilled in the art will understand that any system configured to implement the method steps, in any order, falls within the scope of the embodiments.

As shown, a method 800 begins at step 802, where the TCQ engine 240 receives transform coefficients of prediction residues associated with a block of source video data and converts to a vector of the transform coefficients. At step 804, the adaptation engine 610 acquires any amount and/or types of contextual metadata 202 associated with the transform coefficients. At step 806, the adaptation engine 610 computes block RD multiplier scaling value 650 based on the contextual metadata 202. At step 808, the adaptation engine 610 computes TCQ RD multiplier 652 based on SQ RD multiplier 642 and the block RD multiplier scaling value 650.

At step 810, the TCQ algorithm 670 applies TCQ to the vector of the transform coefficients based on the TCQ RD multiplier 652 to generate TCQ index vector 244 and optional TCQ metadata 242. At step 812, the TCQ engine 240 stores any portion (including none) of the TCQ metadata 242 and transmits the TCQ index vector 244 to a component for use in generating an encoded version of the block of the source video data. The method 800 then terminates.

Figure 9A:
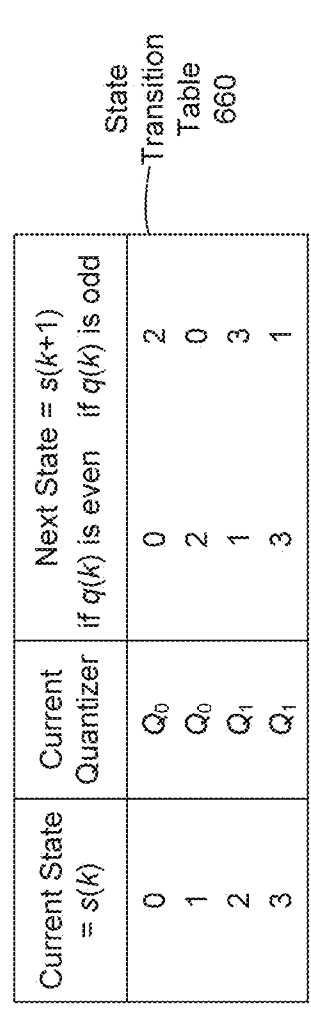
FIG. 9A is an exemplary illustration of the state transition table of FIG. 6, according to various embodiments.

FIG. 9A is an exemplary illustration of the state transition table 660 of FIG. 6, according to various embodiments. For explanatory purposes, the example of the state transition table 660 depicted in FIG. 6 is associated with four states and two sub-quantizers in accordance with an example of the sub-quantizer definitions 662. The four states are denoted 0, 1, 2, and 3. The sub-quantizers are denoted $Q_0$ and $Q_1$.

For explanatory purposes, a current state is denoted as s(k) and is associated with a "current" or $k^{th}$ transform coefficient included in the transform coefficient vector 602. Accordingly k is an integer index into the transform coefficient vector 602. A next or "destination" state is denoted as s(k+1) and is associated with a $(k+1)^{h}$ transform coefficient included in the transform coefficient vector 602. For instance, if k is 0, then the current state and the next state are associated with, respectively, the $0^{th}$ and $1^{st}$ transform coefficients included in the transform coefficient vector 602. As used herein a "current quantizer" indicates the sub-quantizer (either $Q_0$ and $Q_1$) that is to be used to perform TCQ on the current transform coefficient. And q(k) denotes a possible quantization index that is associated with both a current state and a current transform coefficient.

For a current state s(k) of 0, the state transition table 660 specifies that the current sub-quantizer is 0. If q(k) is even, then the next state s (k+1) is 0. If, however, q(k) is odd, then the next state s (k+1) is 2.

For a current state s(k) of 1, the state transition table 660 specifies that the current sub-quantizer is 0. If q(k) is even, then the next state s (k+1) is 2. If, however, q(k) is odd, then the next state s (k+1) is 0.

For a current state s(k) of 2, the state transition table 660 specifies that the current sub-quantizer is 1. If q(k) is even, then the next state s (k+1) is 1. If, however, q(k) is odd, then the next state s (k+1) is 3.

For a current state s(k) of 3, the state transition table 660 specifies that the current sub-quantizer is 1. If q(k) is even, then the next state s (k+1) is 3. If, however, q(k) is odd, then the next state s (k+1) is 1.

Figure 9B:
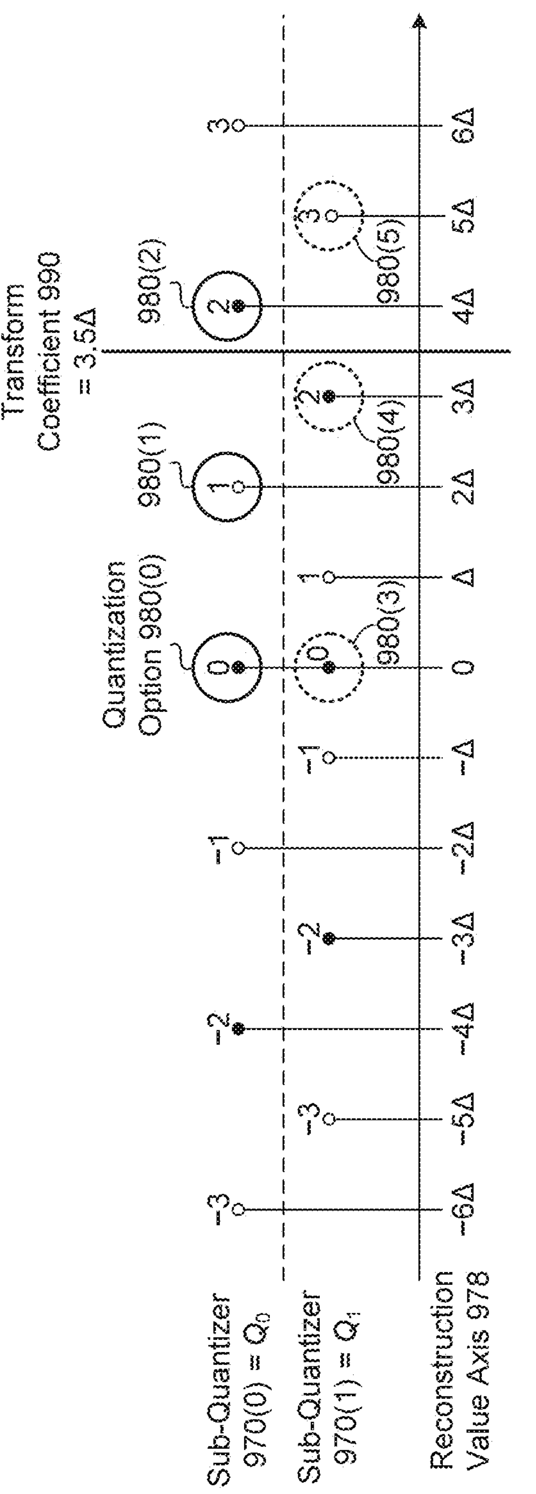
FIG. 9B is an exemplary illustration of selecting quantization options for a transform coefficient in accordance with the sub-quantizer definitions of FIG. 6, according to various embodiments.

FIG. 9B is an exemplary illustration of selecting quantization options for a transform coefficient in accordance with the sub-quantizer definitions 662 of FIG. 6, according to various embodiments. More specifically, FIG. 9B depicts quantization options that the TCQ engine 240 selects based on an example of the sub-quantizer definitions 662 that defines a sub-quantizer 970(0) and a sub-quantizer 970(1). The sub-quantizer 970(0) is denoted $Q_0$ and has a set of reconstruction values corresponding to 2Δq, where Δ denotes the TCQ step size and q denotes a quantization index. The sub-quantizer 970(1) is denoted $Q_1$ and has a set of reconstruction values that includes 0 for q is 0, corresponds to 2Δq+1 for q<0, and corresponds to 2Δq−1 for q>0.

For explanatory purposes, FIG. 9B depicts a portion of a set of reconstruction values for the sub-quantizer 970(0) and a portion of a set of reconstruction values for the sub-quantizer 970(1) along a reconstruction value axis 978. As shown, for the sub-quantizer 970(0), the reconstruction values for quantization indices −3, −2, −1, 0, 1, 2, and 3 are, respectively, −6Δ, −4Δ, −2Δ, 0, 2Δ, 4Δ, and 6Δ. As shown, for the sub-quantizer 970(1), the reconstruction values for quantization indices −3, −2, −1, 0, 1, 2, and 3 are, respectively, −5Δ, −3Δ, −Δ, 0, Δ, 3Δ, and 5Δ.

As described previously herein in conjunction with FIG. 6, the TCQ algorithm 670 selects and computes a cumulative cost function value for each of three different quantization options when performing quantization on a transform coefficient based on a selected sub-quantizer. The three different quantization options are a quantization index of zero, a closest non-zero quantization index with even parity, and a closest non-zero quantization index with odd parity. For explanatory purposes, quantization indices with even parity are depicted in FIG. 9B via filled dots and quantization indices with odd parity are depicted in FIG. 9B via unfilled dots.

FIG. 9B depicts via solid circles a quantization option 980(0), a quantization option 980(1), and a quantization option 980(2) for the sub-quantizer 970(0) that the TCQ algorithm 670 selects for a transform coefficient 990 that is equal to 3.5Δ. The quantization option 980(0) is the quantization index of 0 having a reconstruction value of 0. The quantization option 980(1) is the quantization index of 1 having a reconstruction value of 2Δ. The quantization option 980(2) is the quantization index of 2 having a reconstruction value of 4Δ. As persons skilled in the art will recognize, conventional TCQ algorithms would not typically select the quantization option 980(1).

FIG. 9B also depicts via dashed circles a quantization option 980(3), a quantization option 980(4), and a quantization option 980(5) for the sub-quantizer 970(1) that the TCQ algorithm 670 selects for the transform coefficient 990 that is equal to 3.5Δ. The quantization option 980(3) is the quantization index of 0 having a reconstruction value of 0. The quantization option 980(4) is the quantization index of 2 having a reconstruction value of 3Δ. The quantization option 980(5) is the quantization index of 3 having a reconstruction value of 5Δ. As persons skilled in the art will recognize, conventional TCQ algorithms would not typically select the quantization option 980(5).

Figure 10:
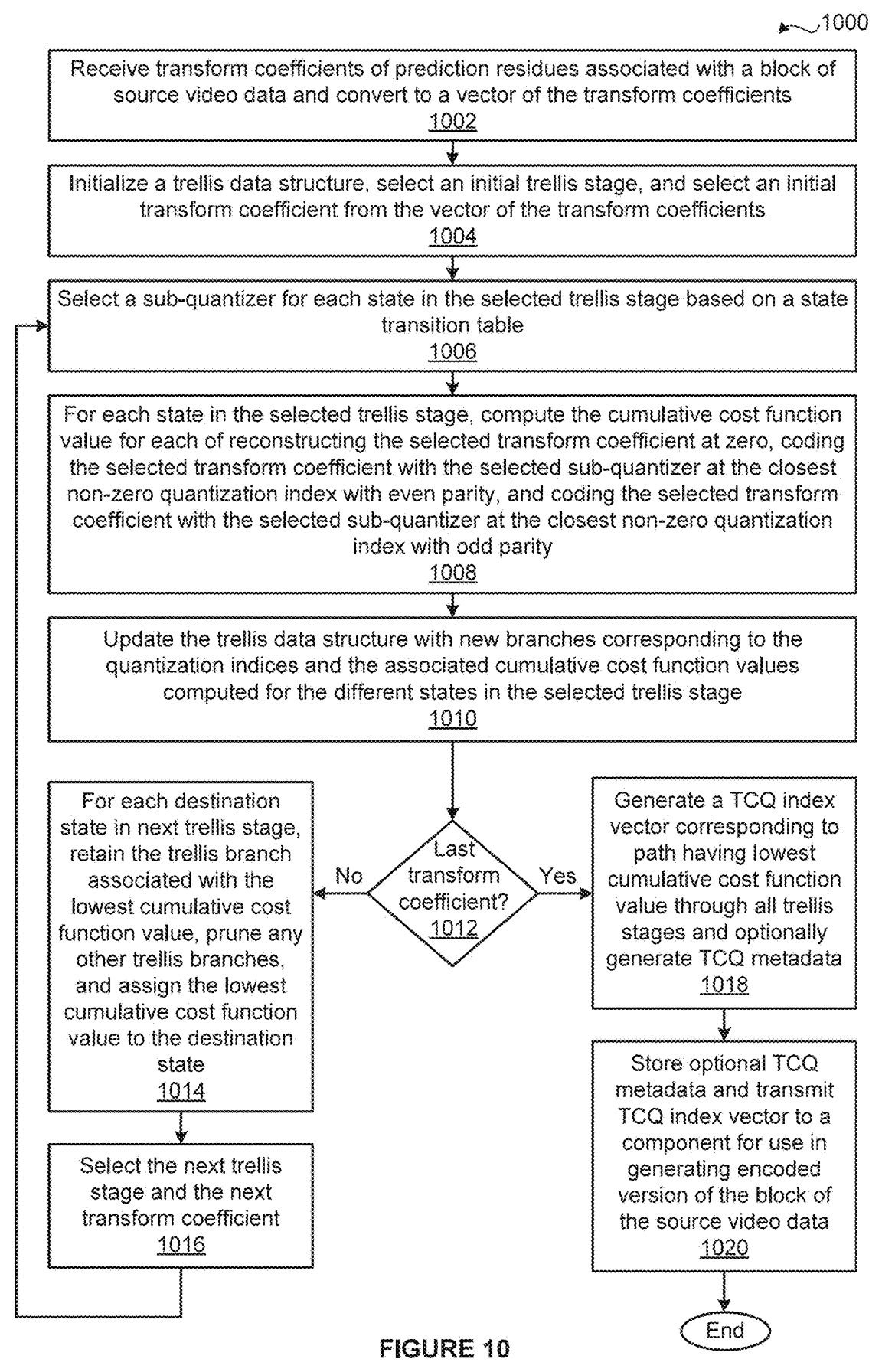

FIG. 10 is a flow diagram of method steps for performing trellis coded quantization when encoding video data, according to various embodiments. Although the method steps are described with reference to the systems of FIGS. 1, 2, 4, 6, 9A, and 9B persons skilled in the art will understand that any system configured to implement the method steps, in any order, falls within the scope of the embodiments.

As shown, a method 1000 begins at step 1002, where the TCQ engine 240 receives transform coefficients of prediction residues associated with a block of source video data and converts to a vector of the transform coefficients. At step 1004, the TCQ engine 240 initializes a trellis data structure, selects an initial trellis stage, and selects an initial transform coefficient from the vector of the transform coefficients. At step 1006, the TCQ engine 240 selects a sub-quantizer for each state in the selected trellis stage based on state transition table 660.

At step 1008, for each state in the selected trellis stage, the TCQ engine 240 computes the cumulative cost function value for each of reconstructing the selected transform coefficient at zero, coding the selected transform coefficient with the selected sub-quantizer at the closest non-zero quantization index with even parity, and coding the selected transform coefficient with the selected sub-quantizer at the closest non-zero quantization index with odd parity. At step 1010, the TCQ engine 240 updates the trellis data structure with new branches corresponding to the quantization indices and the associated cumulative cost function values computed for the different states in the selected trellis stage.

At step 1012, the TCQ engine 240 determines whether the selected transform coefficient is the last transform coefficient in the vector of the transform coefficients. If, at step 1012, the TCQ engine 240 determines that the selected coefficient is not the last transform coefficient in the vector of the transform coefficients, then the method 1200 proceeds to step 1014. At step 1014, for each destination state in the next trellis stage, the TCQ engine 240 retains the trellis branch associated with the lowest cumulative cost function value, prunes any other trellis branches, and assigns the lowest cumulative cost function value to the destination state. At step 1016, the TCQ engine 240 selects the next trellis stage and the next transform coefficient. The method 1000 then returns to step 1006, where the TCQ engine 240 selects a sub-quantizer for each state in the selected trellis stage based on the state transition table 660.

If, however, at step 1012, the TCQ engine 240 determines that the selected transform coefficient is the last transform coefficient in the vector of the transform coefficients, then the method 1000 proceeds directly to step 1018. At step 1018, the TCQ engine 240 generates TCQ index vector 244 corresponding to path having lowest cumulative cost function value through all trellis stages and optionally generates TCQ metadata 242. At step 1020, the TCQ engine 240 stores the optional TCQ metadata 242 and transmits the TCQ index vector 244 to a component for use in generating an encoded version of the block of the source video data. The method 1000 then terminates.

Figure 11:
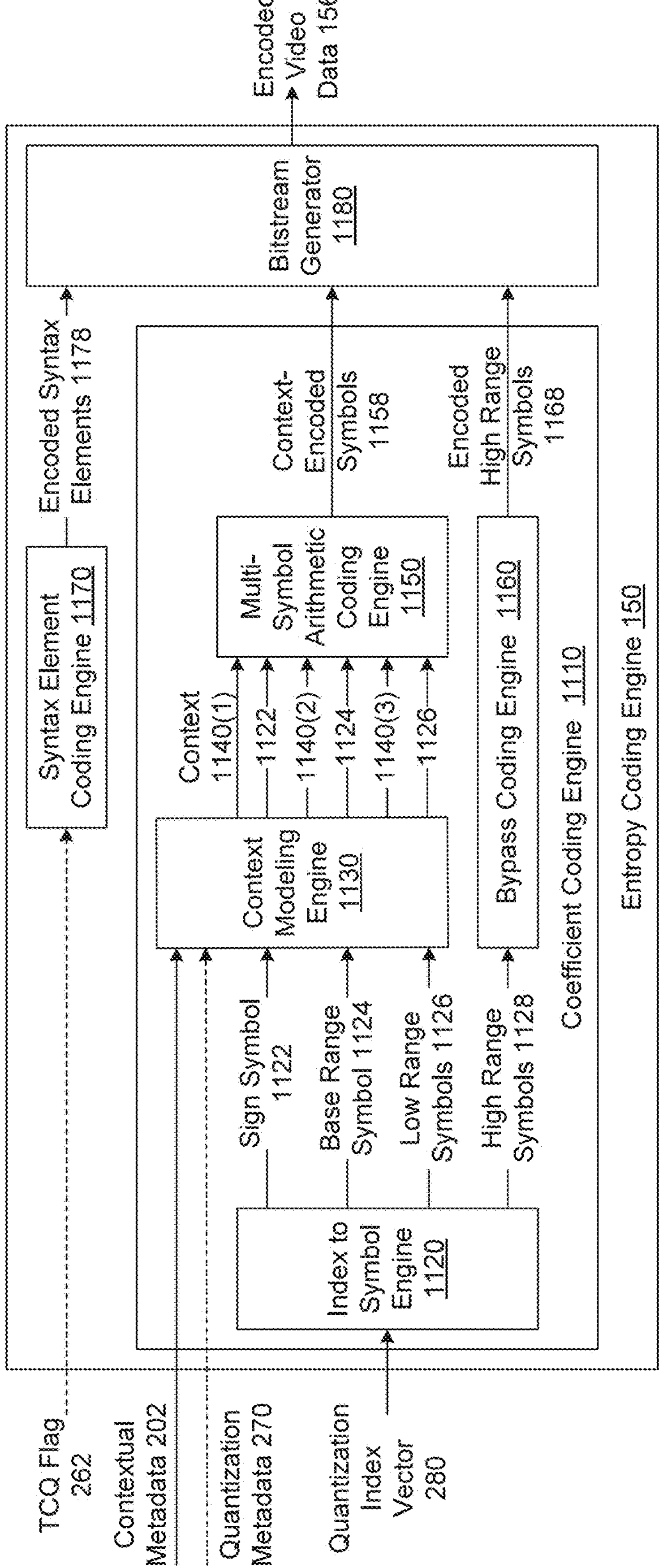
FIG. 11 is a more detailed illustration of the entropy coding engine of FIG. 1, according to various embodiments.

FIG. 11 is a more detailed illustration of the entropy coding engine 150 of FIG. 1, according to various embodiments. For explanatory purposes, the functionality of the entropy coding engine 150 is described in the context of performing entropy coding on the quantization index vector 280 derived from the transform block 210 and optionally the TCQ flag 262 associated with the quantization index vector 280 based on any amount (including none) of the contextual metadata 202 associated with the transform block 210, any amount (including none) of the quantization metadata 270 associated with the transform block 210.

As shown, the entropy coding engine 150 includes, without limitation, a syntax element encoding engine 1170, a coefficient coding engine 1110, and a bitstream generator 1180. The syntax element encoding engine 1170 performs any number and/or types of entropy coding operations on any amount and/or types of syntax-related elements associated with the transform block 210 to generate encoded syntax elements 1178. An example of a syntax element is the TCQ flag 262 that is optionally generated by the quantization engine 140.

The coefficient coding engine 1110 sequentially performs entropy coding operations on each quantization index included in the quantization index vector 280. As described previously herein, the quantization index vector 280 is organized in a predefined coding order. For each quantization index, the coefficient coding engine 1110 can perform any number and/or types of entropy coding operations that are optionally based on any amount (including none) of the contextual metadata 202 associated with the transform block 210 and/or any amount (including none) of the quantization metadata 270 associated with the transform block 210.

As shown, in some embodiments, the coefficient coding engine 1110 includes, without limitation, an index to symbol engine 1120, a bypass coding engine 1160, a context modeling engine 1130, and a multi-symbol arithmetic coding engine 1150. The index to symbol engine 1120 decomposes a "current" quantization index into a sign symbol 1122, a base range symbol 1124, low range symbols 1126, and high range symbols 1128. The bypass coding engine 1160 performs entropy coding on the high range symbols 1138 using variable-length coding in bypass mode to generate encoded high range symbols 1168.

The context modeling engine 1130 determines a context 1140(1) for the sign symbol 1122, a context 1140(2) for the base range symbol 1124, and a context 1140(3) for the low range symbols 1126 based on any portion (including none) of the contextual metadata 202 associated with the transform block 210, any portion (including none) of the quantization metadata 270 associated with the transform block 210, and any portion (including none) of the previously coded symbols in the transform block 210. As used herein, a "context" for a given symbol refers to the identification of a probability model that is to be used for coding the given symbol.

For example, suppose a symbol X has an even distribution between three possible values [0, 1, 2] overall, and the context modeling engine 1130 identifies a context Y for the symbol X. Further suppose that a "conditional probability" for the symbol X given the context Y is skewed, such that $P(X|Y=0)=[0.9, 0.1, 0.]$ and $P(X|Y=1)=[0, 0.1, 0.9]$. As persons skilled in the art will recognize, coding the symbol X based on the observed context Y instead of an even probability distribution can substantially increase the efficiency of coding the symbol X.

As noted previously herein, the context modeling engine 1130 can determine each of the context 1140(1), the context 1140(2), and the context 1140(3) based on any portion (including none) of the contextual metadata 202 associated with the transform block 210, any portion (including none) of the quantization metadata 270 associated with the transform block 210, and any portion (including none) of the previously coded symbols in the same transform block.

Some examples of types of contextual metadata 202 that the context modeling engine 1130 can use to determine the context 1140(1), the context 1140(2), and the context 1140 (3) are coding plane type, transform size, transform/scan type (e.g., 1D, 2D), transform coefficient position within the transform block (e.g., AC or DC, low-frequency or default range), and neighboring transform coefficients. As described previously herein, the quantization metadata 270 associated with the transform block 210 includes at least a portion of either SQ metadata 252 associated with the transform block 210 or TCQ metadata 242 associated with the transform block 210.

Some examples of SQ metadata 252 for each transform block 210 are an end-of-block (EOB) position, a highest absolute index value, a number of consecutive zeros for quantization indices at scan positions before the EOB position, a sum or average of absolute values of all quantization indices at or before the EOB position.

Some examples of types of TCQ metadata 242 that the context modeling engine 1130 can use to determine the context 1140(1), the context 1140(2), and the context 1140 (3) are parity of a previous quantization index, the trellis state associated with the current quantization index, trellis states associated with any number of previous quantization indices, and the sub-quantizer used to generate the current quantization index. Notably, entropy coding techniques implemented in conventional encoders do not account for TCQ metadata when determining contexts for symbols. Accordingly, one technical advantage of the disclosed techniques is that accounting for TCQ metadata when determining contexts during entropy coding can lead to more accurate conditional probability estimations for the symbols and therefore can reduce the rate associated with encoding source video data.

In some embodiments, the context modeling engine 1130 determines at least one of the context 1140(1), the context 1140(2), or the context 1140(3) based, at least in part, on any number of previously coded symbols associated with the transform block 210. For instance, in some embodiments, the context modeling engine 1130 computes any number and/or types of statistics based on any number of previously coded symbols associated with the transform block 210, and then determines at least one of the context 1140(1), the context 1140(2), or the context 1140(3) based, at least in part, on the statistics.

For example, in some embodiments, the context modeling engine 1130 determines the context 1140(1), the context 1140(2), and the context 1140(3) based on any portion (including none) of the contextual metadata 202 associated with the transform block 210, any portion (including none) of the quantization metadata 270 associated with the transform block 210, and the sum of clipped absolute values of three most recently coded transform coefficients.

As shown, the multi-symbol arithmetic coding engine 1150 performs adaptive multi-symbol arithmetic coding on the sign symbol 1122 with the context 1140(1), the base range symbol 1124 with the context 1140(2), and the low range symbols 1126 with the context 1140(3) to generate context-encoded symbols 1158. Although not shown, the context-encoded symbols 1158 include an encoded sign symbol, an encoded base range symbol, and encoded low range symbols.

As shown, the bitstream generator 1180 generates at least a portion of encoded video data 156 based on the encoded syntax elements 1178, the context-encoded symbols 1158 and the encoded high range symbols 1168. The encoded video data 156 is a bitstream that represents an incrementally-generated encoded version of the source video data 102. More specifically, the bitstream generator 1180 adds the encoded syntax elements 1178, the context-encoded symbols 1158, and the encoded high range symbols 1168 to the encoded video data 156.

Referring back to FIG. 1, as persons skilled in the art will recognize, the entropy decoding engine 158 included in the decoder 190 can implement the same process as the entropy coding engine 150 to reconstruct the context 1140(1), the context 1140(2), and the context 1140(3) as part of reconstructing the transform block 210.

Note that the techniques described herein are illustrative rather than restrictive. Many modifications and variations will be apparent to those of ordinary skill in the art without departing from the scope and spirit of the described embodiments and techniques. In particular, it will be apparent to one skilled in the art that in some other embodiments, the context modeling engine 1130 can implement any number and/or types of context entropy coding techniques instead of adaptive multi-symbol arithmetic coding on any portion of the quantization index vector 280 based at least in part on any amount and/or types of the contextual metadata 202 and/or any amount and/or types of the quantization metadata 270.

FIG. 12 is a flow diagram of method steps for performing entropy coding on a quantization index when encoding video data, according to various embodiments. Although the method steps are described with reference to the systems of FIGS. 1, 2, 4, 6, 9A, 9B, and 11 persons skilled in the art will understand that any system configured to implement the method steps, in any order, falls within the scope of the embodiments.

As shown, a method 1200 begins at step 1202, where the index to symbol engine 1120 decomposes a quantization index associated with a block of source video data into sign symbol 1122, base range symbol 1124, low range symbols 1126, and high range symbols 1128. At step 1204, a bypass coding engine 1160 performs entropy coding on the high range symbols 1138 using variable-length coding in bypass mode to generate encoded high range symbols 1168.

At step 1206, a context modeling engine 1130 determines a first context for the sign symbol 1122, a second context for the base range symbol 1124, and a third context for the low range symbols 1126 based on at least one of quantization metadata 270 associated with the block or contextual metadata 202 associated with the block. At step 1208, the multi-symbol arithmetic coding engine 1150 performs adaptive multi-symbol arithmetic coding on the sign symbol 1122 with the first context, the base range symbol 1124 with the second context, and the low range symbols 1126 with the third context to generate encoded sign symbol, encoded base range symbol, and encoded low range symbols.

At step 1210, the bitstream generator 1180 generates an encoded version of the quantization index based on the encoded sign symbol, the encoded base range symbol, the encoded low range symbols, and the encoded high range symbols 1168. At step 1212, the bitstream generator 1180 appends the encoded version of the quantization index to a bitstream representing an encoded version of the source video data. The method 1200 then terminates.

In sum, with the disclosed techniques, an encoder implements TCQ and any combination of disclosed improvements instead of or in addition to SQ in order to increase overall effectiveness when encoding video data. In some embodiments, an encoder includes, without limitation, a prediction engine, a transform engine, a quantization engine, and an entropy coding engine. The prediction engine implements any number and/or types of partitioning and data compression techniques to generate blocks of prediction residues associated with a block of source video data and any amount and/or types of associated contextual metadata. The transform engine applies any number and/or types of transforms (e.g., DCT) to each block of prediction residues to generate a corresponding transform block and any amount and/or types of associated contextual metadata. A transform block includes transform coefficients of prediction residues associated with a block of source video data. The quantization engine performs SQ and/or TCQ operations on a transform block to generate a quantization index vector and optionally any amount and/or types of quantization metadata. The quantization index vector includes a sequence of quantization indices corresponding to transform coefficients included in the transform block. The entropy coding engine performs entropy coding operations on the quantization index vector and any amount and/or types of associated data to generate an encoded version of the quantization index vector. The entropy coding engine appends the encoded version of the quantization index vector to a bitstream representing an encoded version of the source video data.

In some embodiments, the quantization engine includes, without limitation, an SQ engine, a TCQ engine, and a cost reduction engine. The SQ engine individually applies scalar quantization operations and optionally rate-distortion optimized quantization (RDOQ) operations to each transform coefficient included in a transform block to generate a corresponding SQ index and any amount and/or types of SQ metadata. RDOQ operations can modify an SQ index based on an SQ cost function that represents a tradeoff between an estimated number of bits or "rate" required by the entropy coding engine to encode an SQ index and a distortion associated with the SQ index. Notably, either the distortion or the rate is weighted by an SQ RD multiplier.

The TCQ engine reorganizes the transform coefficients included in a transform block into a one-dimensional vector or "sequence" of transform coefficients in accordance with a predefined coding order. The TCQ engine then applies any number and/or types of TCQ operations to the vector of transform coefficients to generate a corresponding TCQ index vector and any amount and/or types of TCQ metadata. More specifically, the TCQ engine incrementally generates and evaluates with respect to a TCQ cost function different possible permutations of the TCQ index vector. The TCQ cost function represents a tradeoff between an estimated number of bits or "rate" required by the entropy coding engine to encode a sequence of one or more transform coefficients and a distortion associated with the sequence. Notably, either the distortion or the rate is weighted by a TCQ RD multiplier that is a scaled version of the SQ RD multiplier.

The cost reduction engine reorganizes the SQ indices associated with the block into an SQ index vector in accordance with the predefined coding order. The cost reduction engine then uses the same RD cost function to compute an SQ RD cost function value and a TCQ cost function value based on the SQ index vector and the TCQ index vector, respectively. The RD cost function can be the SQ cost function, the TCQ cost function or any other RD cost function. The cost reduction engine sets a TCQ flag equal to (TCQ cost function value<SQ cost function value). If the TCQ flag is true, then the cost reduction engine sets a quantization index vector equal to the TCQ index vector and determines quantization metadata based on the TCQ metadata and optionally the TCQ cost function value. Otherwise, the cost reduction engine sets the quantization index vector equal to the SQ index vector and determines quantization metadata based on the SQ metadata and optionally the SQ cost function value. The cost reduction engine transmits the quantization index vector and the TCQ flag to the entropy coding engine for entropy coding and transmission to decoders as part of the bitstream representing the encoded version of the source video data. Note that decoders use the TCQ flag to determine whether to reconstruct each transform block in accordance with SQ or TCQ.

In some other embodiments, the quantization engine includes, without limitation, an algorithm selection engine, the SQ engine, the TCQ engine, and a routing engine. The algorithm selection engine optionally computes any number and/or types of transform statistics based on the transform coefficients included in a transform block. Some examples of transform statistics are block-wise signal energy and number of coefficients with absolute values above a given threshold. The algorithm selection engine then sets a TCQ flag to indicate whether to apply TCQ or SQ to the transform coefficients based on at least one of contextual metadata associated with the transform coefficients or the transform statistics. If the TCQ flag is true, the TCQ engine generates a TCQ index vector and any amount and/or types of TCQ metadata based on the transform coefficients. Otherwise, the SQ engine generates SQ indices and any amount and/or types of SQ metadata based on the transform coefficients. If the TCQ flag is true, then the routing engine sets a quantization index vector equal to the TCQ index vector and sets quantization metadata equal to the TCQ metadata. Otherwise, the routing engine reorganizes the SQ indices associated with the block into the quantization index vector in accordance with the predefined coding order and sets the quantization metadata equal to the SQ metadata. The routing engine transmits the quantization index vector and optionally the TCQ flag to the entropy coding engine for entropy coding and transmission to decoders as part of the bitstream representing the encoded version of the source video data. More specifically, the routing engine transmits the TCQ flag to the entropy coding engine if and only if the routing engine used any transform metadata to determine the TCQ flag. Note that if an encoded version of the TCQ flag is included in the bitstream, then decoders use the TCQ flag to determine whether to reconstruct each transform block in accordance with SQ or TCQ. Otherwise, decoders implement the same process as the quantization engine to reconstruct the TCQ flag.

In various embodiments, relative to TCQ techniques that are implemented in conventional encoders, the TCQ engine evaluates additional possible quantization indices for each transform coefficient. The TCQ engine implements multiple sub-quantizers and a state transition table. Each sub-quantizer includes a different set of symmetric reconstruction values and a reconstruction value of zero. Each reconstruction value is equal to the product of a different quantization index and a TCQ step size, where the TCQ step size can be different for DC coefficients and AC coefficients. For a current transform coefficient and an associated current state, the state transition table specifies the sub-quantizer that is to be used to quantize the current transform coefficient to generate various different possible current quantization indices. The state transition table also specifies a next or "destination" state for the next transform coefficient based on the current state and the parity of a possible current quantization index. More specifically, for each current state, the state transition table specifies different destination states for odd current quantization indices and even current quantization indices.

In operation, the TCQ engine reorganizes the transform coefficients included in the transform block into a one-dimensional vector of transform coefficients in accordance with a predefined coding order. The TCQ engine generates an initial version of a trellis data structure that includes sequential trellis stages corresponding to the transform coefficients in the vector of transform coefficients. An initial trellis stage corresponding to the initial transform coefficient in the vector of transform coefficients includes an uncoded state and a different state for each sub-quantizer. Each subsequent trellis stage includes an uncoded state and each state represented by the state transition table. With the exception of the uncoded state in the last trellis stage, each uncoded state is connected to the uncoded state in the next trellis stage by a different branch. Notably, an uncoded state in a given trellis stage associated with a given transform coefficient reflects a path through the trellis for which all previous transform coefficients are uncoded. The TCQ engine assigns a cumulative cost function value of zero to each state in the initial trellis stage and to each uncoded state.

The TCQ engine sequentially executes a quantization evaluation process for each transform coefficient included in the vector of transform coefficients based on the trellis data structure, the state transition table, and the sub-quantizers. To execute the quantization evaluation process for a current transform coefficient, the TCQ engine selects the corresponding trellis stage. For each state in the selected trellis stage, the TCQ engine selects a sub-quantizer based on the state transition table. For each state in the selected trellis stage, the TCQ engine computes a cumulative cost function value for each of the current transform coefficient at zero, coding the current transform coefficient with the selected sub-quantizer at the closest non-zero quantization index with even parity, and coding the current transform coefficient with the selected sub-quantizer at the closest non-zero quantization index with odd parity. As persons skilled in the art will recognize, conventional implementations of TCQ typically evaluate the current transform coefficient at zero and the current transform coefficient at the closest non-zero quantization index irrespective of the parity of the closest non-zero quantization index. By contrast, with the disclosed techniques, the TCQ engine evaluates an additional possible quantization index for each state included in each trellis state.

The TCQ engine updates the trellis data structure with new branches corresponding to the quantization indices and the associated cumulative cost function values computed for the different states in the selected trellis stage. Each of the new branches connects a different combination of a state in the selected trellis stage and a "destination" state in a next trellis stage. For each destination state in the next trellis stage, the TCQ engine retains the trellis branch associated with the lowest cumulative cost function value, prunes any other trellis branches, and assigns the lowest cumulative cost function value to the destination state. After the TCQ engine finishes executing the quantization evaluation process for the last transform coefficient included in the vector of transform coefficients, the TCQ engine selects a path that has the lowest cumulative cost function value through all trellis stages. The TCQ engine generates a TCQ index vector that includes the quantization indices corresponding to the selected path. The TCQ engine optionally generates any amount and/or types of TCQ metadata associated with the quantization process. Note that inverse TCQ engines included in decoders can implement an inverse of the quantization evaluation process to reconstruct each transform block.

In various embodiments, the TCQ engine adaptively scales a TCQ step size for AC coefficients and a TCQ step size for DC coefficients with respect to, respectively, an SQ step size for AC coefficients and an SQ step size for DC coefficients. The TCQ engine is configured to implement TCQ step sizing according to a step size scaling granularity (e.g., per-frame, per-slice, per block). For each transform block, the TCQ engine optionally selects a default step size scaling value from contextual metadata associated with the transform block based on the step size scaling granularity. The TCQ engine then computes a block step size scaling value based on any amount and/or types of contextual metadata associated with the transform block and optionally the default step size scaling value and/or the default step size scaling granularity. Some examples of contextual metadata include a coding plane type, frame type, slice type, position in the prediction structure, block type, block size, and transform coefficient energy levels, values of the SQ step sizes, transform coefficient positions within the transform block (e.g., AC or DC, low-frequency or default range). The TCQ engine multiplies the SQ step size for AC coefficients and the block step size scaling value to generate the TCQ step size for AC coefficients. The TCQ engine multiplies the SQ step size for DC coefficients and the block step size scaling value to generate the TCQ step size for DC coefficients. Note that decoders can implement the same process as the TCQ engine to reconstruct the TCQ step sizes when reconstructing each transform block.

In the same or other embodiments, the TCQ engine adaptively scales the SQ RD multiplier included in the SQ cost function to generate the TCQ RD multiplier included in the TCQ cost function. As described previously herein, the SQ RD multiplier and the TCQ RD multiplier weight either the rate terms or the distortion terms included in, respectively, the SQ cost function and the TCQ cost function. For each transform block, the TCQ engine computes a block RD multiplier scaling value based on any amount and/or types of contextual metadata associated with the transform block. Some examples of contextual metadata include a coding plane type (e.g., luma, chroma), frame type (inter, intra), position in the prediction structure, block type, block size, and transform coefficient energy levels. The TCQ engine sets the TCQ RD multiplier equal to the product of the SQ RD multiplier and the block RD multiplier scaling value. Note that decoders do not use the TCQ cost function to reconstruct the transform block from a decoded TCQ vector and therefore the TCQ RD multiplier is not transmitted to any decoders.

In various embodiments, the entropy coding engine includes a syntax coding engine, a coefficient coding engine, and a bitstream generator. For each transform block, the syntax coding engine performs entropy coding on any number and/or types of syntax-related data associated with the transform block to generate encoded syntax elements. An example of a syntax element is an optional TCQ flag generated by the quantization engine. For each transform block, the coefficient coding engine performs entropy coding on the quantization index vector to generate context-encoded symbols and encoded high-range symbols. As used herein, a "context" for a given symbol refers to the identification of a probability model that is to be used for coding the given symbol.

In some embodiments, the coefficient encoding engine performs entropy coding operations sequentially on each quantization index included in the quantization index vector. The coefficient encoding engine decomposes a current quantization index into a sign symbol, a base range symbol, low range symbols, and high range symbols. The coefficient encoding engine performs entropy coding operations on the high range symbols using variable-length coding in bypass mode to generate encoded high range symbols. The coefficient encoding engine determines a first context for the sign symbol, a second context for the base range symbol, and a third context for the low range symbols based on any amount and/or types of contextual metadata and optionally any amount and/or types of TCQ metadata associated with the block.

Some examples of contextual metadata are coding plane type, transform size, transform/scan type (e.g., 1D, 2D), coefficient position within the transform block (e.g., AC or DC, low-frequency or default range), and neighboring transform coefficients. The quantization metadata associated with a block can be TCQ metadata or SQ metadata. Some examples of TCQ metadata are parity of a previous quantization index, the trellis state associated with the current quantization index, trellis states associated with any number of previous quantization indices, and the sub-quantizer used to generate the current quantization index. Notably, entropy coding techniques implemented in conventional encoders do not account for TCQ metadata when determining contexts for symbols. Some examples of SQ metadata 252 for each transform block 210 are an end-of-block (EOB) position, a highest absolute index value, a number of consecutive zeros for quantization indices at scan positions before the EOB position, a sum or average of absolute values of all quantization indices at or before the EOB position.

The coefficient engine performs adaptive multi-symbol arithmetic coding on the sign symbol with the first context, the base range symbol with the second context, and the low range symbols with the third context to generate an encoded sign symbol, an encoded base range symbol, and encoded low range symbols. The encoded base range symbol, the encoded sign symbol, and the encoded base range symbol are context-encoded symbols. The bitstream generator adds the encoded syntax elements, the encoded base range symbol, the encoded sign symbol, the encoded base range symbol, and the encoded high-range symbols, which make up an encoded version of the quantization index, to a bitstream representing an encoded version of the source video data. Note that entropy decoding engines included in decoders can implement the same process as the entropy coding engine to reconstruct the contexts when reconstructing each transform block.

At least one technical advantage of the disclosed techniques relative to the prior art is that, with the disclosed techniques, trellis coded quantization operations are applied to a sequence of transform coefficients corresponding to a block of video data to generate a sequence of quantization indices that can be more effectively compressed during entropy coding. In this regard, with the disclosed techniques, different possible permutations of the sequence of quantization indices are generated and evaluated with respect to a cost function that represents a tradeoff between an estimated distortion and an estimated entropy coding efficiency associated with the entire sequence of quantization indices, and the permutation associated with the lowest cost function value is then used when encoding the block of video data. Because the disclosed techniques account for entropy coding efficiency when generating the different sequences of quantization indices, the disclosed techniques can exploit opportunities for increased compression during entropy coding. As a result, overall encoding efficiency can be increased relative to what can be achieved using conventional scalar quantization operations. These technical advantages provide one or more technological advancements over prior art approaches.

1. In some embodiments, a computer-implemented method for encoding video data comprises receiving a plurality of transform coefficients of prediction residues; setting a flag value based on at least one of metadata associated with a first vector that includes the plurality of transform coefficients or a set of transform statistics associated with the plurality of transform coefficients; performing one or more trellis coded quantization operations on the first vector to generate a second vector that includes a plurality of quantization indices or one or more scalar quantization operations on the plurality of transform coefficients to generate a set of quantization indices based on the flag value; and performing one or more entropy coding operations on either the second vector that includes the plurality of quantization indices or a third vector that includes the set of quantization indices to generate encoded video data.

2. The computer-implemented method of clause 1, wherein the flag value indicates that trellis coded quantization is performed on the first vector that includes the plurality of transform coefficients.

3. The computer-implemented method of clauses 1 or 2, wherein first metadata also is generated by performing the one or more trellis coded quantization operations on the first vector, and further comprising storing at least a portion of the first metadata in memory.

4. The computer-implemented method of any of clauses 1-3, wherein the flag value indicates that scalar quantization is performed on the plurality of transform coefficients.

5. The computer-implemented method of any of clauses 1-4, wherein second metadata also is generated by performing the one or more scalar quantization operations on the plurality of transform coefficients, and further comprising storing at least a portion of the second metadata in memory.

6. The computer-implemented method of any of clauses 1-5, further comprising converting the set of quantization indices into the third vector that includes the set of quantization indices.

7. The computer-implemented method of any of clauses 1-6, wherein either the second vector that includes the plurality of quantization indices or a third vector that includes the set of quantization indices is transmitted to an entropy coding engine that performs the one or more entropy coding operations.

8. The computer-implemented method of any of clauses 1-7, further comprising computing the set of transform statistics based on the plurality of transform coefficients.

9. The computer-implemented method of any of clauses 1-8, further comprising storing at least a portion of the set of transform statistics in memory.

10. The computer-implemented method of any of clauses 1-9, wherein the flag value also is transmitted to the entropy coding engine that performs the one or more entropy coding operations.

11. In some embodiments, one or more non-transitory, computer-readable media store instructions that, when executed by one or more processors, cause the one or more processors to perform the steps of receiving a plurality of transform coefficients of prediction residues; setting a flag value based on at least one of metadata associated with a first vector that includes the plurality of transform coefficients or a set of transform statistics associated with the plurality of transform coefficients; performing one or more trellis coded quantization operations on the first vector to generate a second vector that includes a plurality of quantization indices or one or more scalar quantization operations on the plurality of transform coefficients to generate a set of quantization indices based on the flag value; and performing one or more entropy coding operations on either the second vector that includes the plurality of quantization indices or a third vector that includes the set of quantization indices to generate encoded video data.

12. The one or more non-transitory, computer-readable media of clause 11, further comprising transmitting the flag value to a decoder, wherein the flag value indicates to the decoder whether to reconstruct a block of transform coefficients in accordance with either scalar quantization or trellis coded quantization.

13. The one or more non-transitory, computer-readable media of clauses 11 or 12, wherein a quantization engine included in an encoder generates the flag value using a plurality of operations, the flag value is not transmitted to a decoder, and the decoder reconstructs the flag value based on the plurality of operations.

14. The one or more non-transitory, computer-readable media of any of clauses 11-13, wherein the set of transform statistics includes at least one of a block-wise signal energy or a number of transform coefficients having absolute values above a given threshold.

15. The one or more non-transitory, computer-readable media of any of clauses 11-14, wherein the flag value indicates that trellis coded quantization is performed on the first vector that includes the plurality of transform coefficients.

16. The one or more non-transitory, computer-readable media of any of clauses 11-15, wherein first metadata also is generated by performing the one or more trellis coded quantization operations on the first vector, and further comprising storing at least a portion of the first metadata in memory.

17. The one or more non-transitory, computer-readable media of any of clauses 11-16, wherein the flag value indicates that scalar quantization is performed on the plurality of transform coefficients.

18. The one or more non-transitory, computer-readable media of any of clauses 11-17, wherein second metadata also is generated by performing the one or more scalar quantization operations on the plurality of transform coefficients, and further comprising storing at least a portion of the second metadata in memory.

19. The one or more non-transitory, computer-readable media of any of clauses 11-18, further comprising converting the set of quantization indices into the third vector the includes the set of quantization indices.

20. In some embodiments, a computer system comprises one or more memories storing instructions and one or more processors that are coupled to the one or more memories and, when executing the instructions, are configured to perform the steps of receiving a plurality of transform coefficients of prediction residues; setting a flag value based on at least one of metadata associated with a first vector that includes the plurality of transform coefficients or a set of transform statistics associated with the plurality of transform coefficients; performing one or more trellis coded quantization operations on the first vector to generate a second vector that includes a plurality of quantization indices or one or more scalar quantization operations on the plurality of transform coefficients to generate a set of quantization indices based on the flag value; and performing one or more entropy coding operations on either the second vector that includes the plurality of quantization indices or a third vector that includes the set of quantization indices to generate encoded video data.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for encoding video data, the method comprising:

receiving a plurality of transform coefficients of prediction residues;

setting a flag value based on at least one of metadata associated with a first vector that includes the plurality of transform coefficients or a set of transform statistics associated with the plurality of transform coefficients;

performing one or more trellis coded quantization operations on the first vector to generate a second vector that includes a plurality of quantization indices or one or more scalar quantization operations on the plurality of transform coefficients to generate a set of quantization indices based on the flag value; and performing one or more entropy coding operations on either the second vector that includes the plurality of quantization indices or a third vector that includes the set of quantization indices to generate encoded video data.

2. The computer-implemented method of claim 1, wherein the flag value indicates that trellis coded quantization is performed on the first vector that includes the plurality of transform coefficients.

3. The computer-implemented method of claim 2, wherein first metadata also is generated by performing the one or more trellis coded quantization operations on the first vector, and further comprising storing at least a portion of the first metadata in memory.

4. The computer-implemented method of claim 1, wherein the flag value indicates that scalar quantization is performed on the plurality of transform coefficients.

5. The computer-implemented method of claim 4, wherein second metadata also is generated by performing the one or more scalar quantization operations on the plurality of transform coefficients, and further comprising storing at least a portion of the second metadata in memory.

6. The computer-implemented method of claim 1, further comprising converting the set of quantization indices into the third vector that includes the set of quantization indices.

7. The computer-implemented method of claim 1, wherein either the second vector that includes the plurality of quantization indices or a third vector that includes the set of quantization indices is transmitted to an entropy coding engine that performs the one or more entropy coding operations.

8. The computer-implemented method of claim 7, further comprising computing the set of transform statistics based on the plurality of transform coefficients.

9. The computer-implemented method of claim 8, further comprising storing at least a portion of the set of transform statistics in memory.

10. The computer-implemented method of claim 7, wherein the flag value also is transmitted to the entropy coding engine that performs the one or more entropy coding operations.

11. One or more non-transitory, computer-readable media storing instructions that, when executed by one or more processors, cause the one or more processors to perform the steps of:

receiving a plurality of transform coefficients of prediction residues;

setting a flag value based on at least one of metadata associated with a first vector that includes the plurality of transform coefficients or a set of transform statistics associated with the plurality of transform coefficients;

performing one or more trellis coded quantization operations on the first vector to generate a second vector that includes a plurality of quantization indices or one or more scalar quantization operations on the plurality of transform coefficients to generate a set of quantization indices based on the flag value; and performing one or more entropy coding operations on either the second vector that includes the plurality of quantization indices or a third vector that includes the set of quantization indices to generate encoded video data.

12. The one or more non-transitory, computer-readable media of claim 11, further comprising transmitting the flag value to a decoder, wherein the flag value indicates to the decoder whether to reconstruct a block of transform coefficients in accordance with either scalar quantization or trellis coded quantization.

13. The one or more non-transitory, computer-readable media of claim 11, wherein a quantization engine included in an encoder generates the flag value using a plurality of operations, the flag value is not transmitted to a decoder, and the decoder reconstructs the flag value based on the plurality of operations.

14. The one or more non-transitory, computer-readable media of claim 11, wherein the set of transform statistics includes at least one of a block-wise signal energy or a number of transform coefficients having absolute values above a given threshold.

15. The one or more non-transitory, computer-readable media of claim 11, wherein the flag value indicates that trellis coded quantization is performed on the first vector that includes the plurality of transform coefficients.

16. The one or more non-transitory, computer-readable media of claim 15, wherein first metadata also is generated by performing the one or more trellis coded quantization operations on the first vector, and further comprising storing at least a portion of the first metadata in memory.

17. The one or more non-transitory, computer-readable media of claim 11, wherein the flag value indicates that scalar quantization is performed on the plurality of transform coefficients.

18. The one or more non-transitory, computer-readable media of claim 17, wherein second metadata also is generated by performing the one or more scalar quantization operations on the plurality of transform coefficients, and further comprising storing at least a portion of the second metadata in memory.

19. The one or more non-transitory, computer-readable media of claim 11, further comprising converting the set of quantization indices into the third vector the includes the set of quantization indices.

20. A computer system, comprising:

one or more memories storing instructions; and one or more processors that are coupled to the one or more memories and, when executing the instructions, are configured to perform the steps of:

receiving a plurality of transform coefficients of prediction residues;

setting a flag value based on at least one of metadata associated with a first vector that includes the plurality of transform coefficients or a set of transform statistics associated with the plurality of transform coefficients;

performing one or more trellis coded quantization operations on the first vector to generate a second vector that includes a plurality of quantization indices or one or more scalar quantization operations on the plurality of transform coefficients to generate a set of quantization indices based on the flag value; and performing one or more entropy coding operations on either the second vector that includes the plurality of quantization indices or a third vector that includes the set of quantization indices to generate encoded video data.

* * * * *